US011372410B2

(12) United States Patent
Egner

(10) Patent No.: US 11,372,410 B2
(45) Date of Patent: Jun. 28, 2022

(54) METHODS AND APPARATUS FOR REGULATING A POSITION OF A DRONE

(71) Applicant: Axon Enterprise, Inc., Scottsdale, AZ (US)

(72) Inventor: Will A. Egner, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 314 days.

(21) Appl. No.: 16/752,666

(22) Filed: Jan. 26, 2020

(65) Prior Publication Data

US 2020/0159223 A1 May 21, 2020

Related U.S. Application Data

(63) Continuation-in-part of application No. 16/388,324, filed on Apr. 18, 2019, now Pat. No. 11,112,798.

(60) Provisional application No. 62/659,822, filed on Apr. 19, 2018.

(51) Int. Cl.
*G05D 1/00* (2006.01)
*G05D 1/12* (2006.01)
*B64C 39/02* (2006.01)
*H04N 1/393* (2006.01)
*H04S 7/00* (2006.01)

(52) U.S. Cl.
CPC ......... *G05D 1/0094* (2013.01); *B64C 39/024* (2013.01); *G05D 1/12* (2013.01); *H04N 1/3935* (2013.01); *H04S 7/302* (2013.01); *B64C 2201/127* (2013.01); *B64C 2201/22* (2013.01); *H04S 2400/11* (2013.01)

(58) Field of Classification Search
CPC ...... G05D 1/0094; G05D 1/12; B64C 39/024; B64C 2201/127; B64C 2201/22; H04N 1/3935; H04S 7/302; H04S 2400/11
See application file for complete search history.

(56) References Cited

U.S. PATENT DOCUMENTS 9,056,676 B1 * 6/2015 Wang ................. B60R 9/00
9,164,506 B1 * 10/2015 Zang ................ G05D 1/0094
9,471,059 B1 10/2016 Wilkins
9,563,201 B1 2/2017 Tofte et al.
(Continued)

FOREIGN PATENT DOCUMENTS

WO 201480388 A2 5/2014
WO 2017223531 A1 12/2017
WO 2018022021 A1 2/2018

OTHER PUBLICATIONS

USPTO, Notice of Allowance for U.S. Appl. No. 16/388,324 dated Apr. 30, 2021.

*Primary Examiner* — Richard M Camby
(74) *Attorney, Agent, or Firm* — Letham Law Firm, LLC

(57) ABSTRACT

A drone autonomously operates to track an object, track an object while being stealthy and/or observe the details of an object while maintaining communication at a rate equal to or greater than a threshold. A drone may operate to maintain the image of an object at or above a predetermined resolution in an image captured by a camera mounted on the drone and to maintain a wireless communication rate equal to or greater than a threshold rate. A drone may operate so that the sound intensity level caused by the operation of the drone is less than or equal to a sound intensity level threshold as perceived by an object (e.g., person, target, suspect) being tracked.

20 Claims, 6 Drawing Sheets

(56) References Cited

U.S. PATENT DOCUMENTS

| | | |
|---|---|---|
| 9,609,288 B1 | 3/2017 | Richman et al. |
| 9,930,298 B2 | 3/2018 | Bevirt |
| 9,989,965 B2 | 6/2018 | Cuban et al. |
| 10,642,271 B1 | 5/2020 | Graber et al. |
| 2010/0013917 A1 | 1/2010 | Hanna et al. |
| 2013/0200207 A1 | 8/2013 | Pongratz et al. |
| 2015/0350614 A1* | 12/2015 | Meier ................ H04N 5/23229 348/144 |
| 2018/0075759 A1 | 3/2018 | Kim et al. |
| 2019/0004172 A1* | 1/2019 | Moskovchenko ...... G01S 7/529 |

* cited by examiner

METHODS AND APPARATUS FOR REGULATING A POSITION OF A DRONE

FIELD OF THE INVENTION

Embodiments of the present disclosure relate to regulating operation of a drone.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
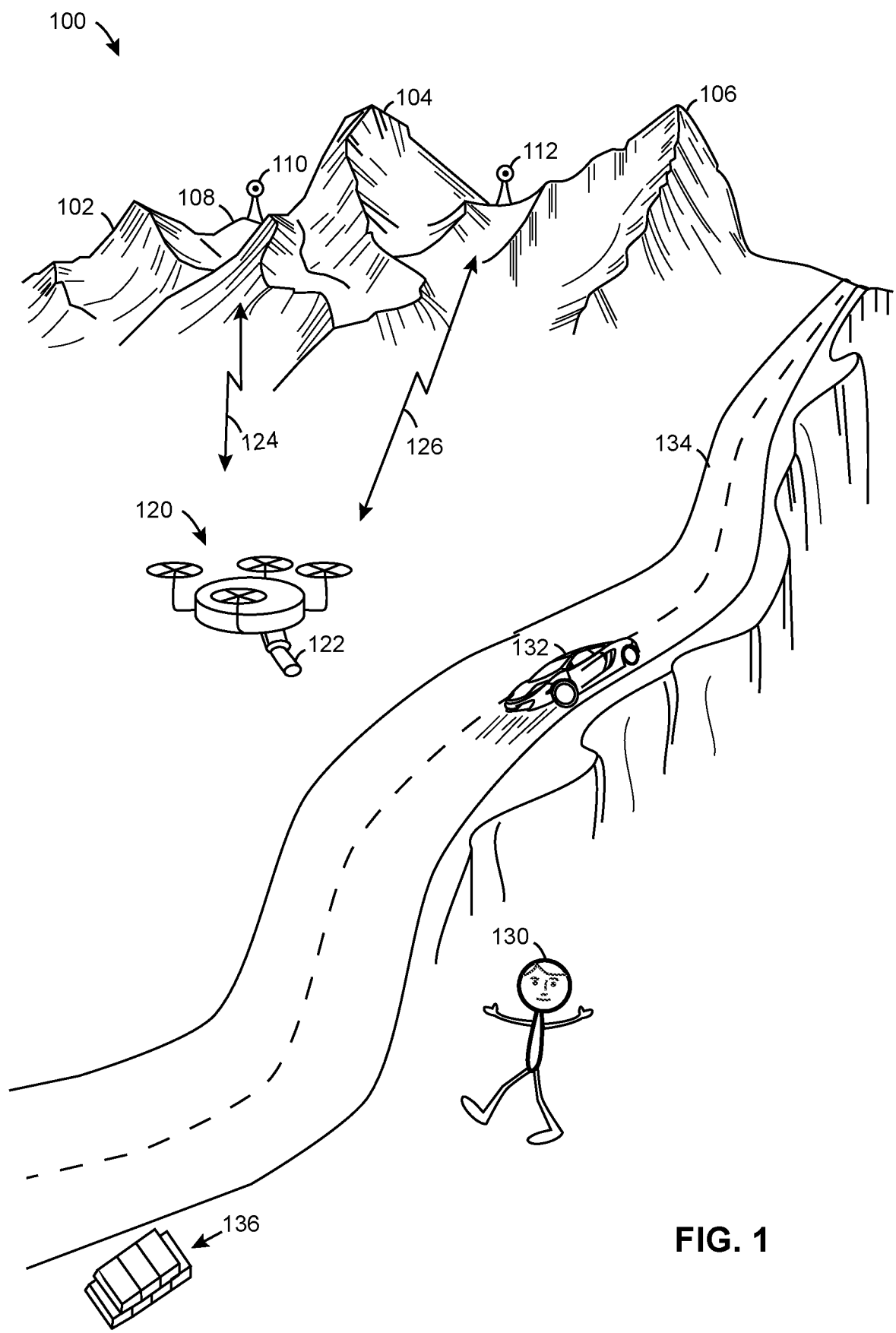
FIG. 1 is a view situation in which a drone tracks and/or observes an object according to various aspects of the present disclosure.

Unmanned aerial vehicles (e.g., drones, UAFs) are used in many situations such as photography, oil exploration, disaster relief, and product delivery. Security agencies (e.g., police, fire, private) may use drones to perform surveillance. A drone may be used by security personnel (e.g., officers, agents, police officers) to surveil the position, activities, and movements of a suspect. A drone may carry a camera (e.g., still, video) to surveil a suspect. Data from the camera may be used to aid autonomous movement of the drone. A drone may operate in a stealth mode to reduce a likelihood that the suspect being surveilled will not notice the drone.

A drone may also be used to establish and/or improve communication. A drone may be positioned to establish or improve communication between officers. Officers may use communication devices (e.g., radios, smart phones) to communicate with each other. The communication devices may use any communication protocol. A drone may function as a communication hub. For example, a done may perform the functions of a WiFi access point to enable communication between officers. A drone may be used to extend cell phone range to enable communication between officers. Communication devices carried or used by officers may establish wireless communication with the drone. The drone may relay communications from one officer to another. The drone may position itself so that all officers, or some, may communicate with the drone and therefore with each other.

A drone may establish or improve communication between officers and a server or between the drone and a server. A drone may communicate with a server via a network. For example, a drone may establish wireless communication with one or more base stations of a network (e.g., cellular 3G, LTE, 5G). The drone may communicate wirelessly with a base station. The base station may communicate with a server via one or more other networks. A drone may communicate (e.g., transmit, receive) data via the wireless connection with a base station. Data transmitted by a drone may originate in the drone (e.g., photographic data, video data, audio data, GPS data, drone status data). Data communicated by a drone may be received from or transmitted to a communication device used by an officer.

A drone may move, in three dimensions (e.g., x, y, z; latitude, longitude, altitude), to establish and/or improve communication with a base station. A drone may move to avoid an object that lies in the line-of-sight between the drone and a base station. A drone may move to a position, in three-dimensions, where there are no obstructions between the drone and the base station thereby establishing communication and/or improving communication between the drone and the base station.

A server that receives data from or transmits data to a drone may be located in an office (e.g., headquarters) of a security agency. The office may be distant from the drone. A location of the server may be remote from a location of the drone. The data transmitted by the drone and received by the server may include streaming video captured by a video camera on the drone. The server may be remotely located when the drone records and/or transmits the data.

A drone may also receive data from a server. Data transmitted by a server and received by a drone may include map data, topographical data, information regarding a suspect, a vehicle owner, and/or instructions to officers.

A drone may receive instructions (e.g., commands) from a server via a base station that control (e.g., manipulate, alter, instruct) the flight (e.g., movement in three dimensions) of the drone. A drone may receive, either exclusively or in addition to commands from a server, flight instructions from a remote control operated by an officer near the location of the drone. Using a remote control, an officer may control all aspects (e.g., geographic position, altitude, roll, pitch, yaw, camera on, camera off, communication on, communication off) of the operation of a drone. Some aspects of the flight of a drone may be automated so that the drone may control all or a portion of its movements without user intervention and/or instructions from a server. For example, an officer may provide a drone a command (e.g., stealth mode operation, tracking mode operation, observation mode operation) and the drone may control its flight in accordance with the command (e.g., mode of operation).

A drone may use a camera mounted on the drone to detect objects. A drone may provide video data (e.g., still images, motion images) to an officer and/or to a server. An officer may use the video data captured by the camera of the drone to select an object (e.g., target, suspect) for tracking and/or observation. An object may include a human suspect, a person of interest, a witness, a victim, a vehicle, and/or crime related paraphernalia (e.g., pile of money, drugs, guns, etc.). A drone may autonomously (e.g., automatically), with no user intervention, mostly autonomously with only some user intervention, or independent of any user intervention, track a selected and/or detected object. A drone may autonomously or mostly autonomously observe an object. A drone may autonomously or mostly autonomously track an object in a stealthy manner (e.g., stealth mode).

Tracking an object includes capturing video data of the object at a resolution that enables detecting (e.g., finding) the object in video data (e.g., a video image, frame of video), and moving along with (e.g., tracking, following, shadowing) the object as the object moves. Tracking an object means that the object remains detectable (e.g., uniquely detectable among other objects in an environment) in subsequent video data (e.g., object does not move out of camera range, object does not become undetectable due to low resolution of the object in subsequent frames of video data).

While tracking an object, the camera on the drone must capture images of the object with a resolution (e.g., number of pixels) sufficient to detect the object. The term object resolution means the resolution of an object in an image. The minimum number of pixels, or minimum object resolution, needed to detect an object for tracking is referred herein as the surveillance resolution (e.g., tracking resolution).

Object resolution may be expressed as a fixed number of pixels (e.g., 1000, 10000) or a portion (e.g., percentage) of the total number of pixels captured by the image sensor. For example, surveillance resolution may be expressed as 1000 pixels. In this example, if the object is represented by at least 1000 pixels in an image, the resolution of the object is sufficient to detect the object for tracking. Since the object may be detected, it may be detected in subsequent images captured by the camera and therefore tracked (e.g., surveilled). In another example, the surveillance resolution is expressed as 1% of the total number of pixels of an image (e.g., number of pixels of the sensor that captured the image). For this example, if an object is represented by at least 1% of the pixels of the total number of pixels of an image, the object resolution is sufficient to detect the object and therefore track the object.

While observing an object (e.g., observation mode), the camera on the drone may capture an image of the object, or a portion of the object, with a resolution sufficient to detect visual details (e.g., license plate, weapon type, serial number, eye color, expression, physical features, clothing, finger print, tattoo) of the object. The minimum number of pixels needed to detect visual details of the object is referred herein as the observation resolution.

As with the surveillance resolution, the minimum number of pixels for detecting visual details of an object may be expressed as a fixed number of pixels (e.g., 107520, 8.4 megapixels) or a portion (e.g., percentage) of the total number of pixels of an image. For example, observation resolution may be at least 107520 pixels for a sensor. In this example, if the object is represented by at least 107520 pixels in an image, or the sensor, the resolution of the object is sufficient to detect visual details of the object. In another example, the observation resolution is 35% of the total number of pixels of an image (e.g., sensor). For this example, if the object is represented by at least 35% of the pixels of the total number of pixels of an image, the resolution is sufficient to detect visual details of the object (e.g., a person).

The number of pixels needed to detect an object in a video image depends on many factors including the type sensor that captures the image, the area of the sensor, the sensitivity of the sensor, the number of pixels in the sensor (e.g., 640×480, 1600×1200, 6016×4016), pixel size, the shape of the object, the size of the object, the type of the object, the luminosity of the object, atmospheric light, and time of exposure. In embodiments, the observation resolution and surveillance resolution each include a resolution that is less than all of the fixed number of pixels of the sensor.

The surveillance resolution and/or observation resolution for one sensor may be different from the surveillance resolution and/or observation resolution for another sensor. For example, a sensor with 640×480 pixels may need to capture an object with at least 10,000 pixels, which is 3.3% of the total pixels, to be able to detect the object for tracking. In another example, a sensor with 6016×4016 pixels may need to capture an object with at least 241,602 pixels, which is 1% of the total pixels, to be able to detect the object for tracking. The number of pixels needed for tracking an object may also vary with atmospheric conditions (e.g., light, smoke, haze). As photographic conditions deteriorate, the number of pixels needed to detect and track an object may increase. For example, when there is a thin haze in the air, a sensor with 640×480 pixels may need to use between 10% and 15% of the total pixels to capture the object for tracking. In the same conditions, a sensor with 6016×4016 pixels may need to use between 3% and 5% of the total pixels to capture the object for tracking.

A similar situation exists for the observation resolution with respect to different sensors and atmospheric conditions. For example, a sensor with 640×480 pixels may need to capture an object with at least 55% of the total pixels to be able to detect the visual details of the object. In another example, a sensor with 6016×4016 pixels may need to capture an object with at least 35% of the total pixels to be able to detect the visual details of the object. The number of pixels needed for observing an object may also vary with atmospheric conditions (e.g., light, smoke, haze); however, because the camera likely will need to be physically closer to an object to capture visual details rather than detecting the object for tracking, the effect of the atmosphere on the number of pixels needed for the observation resolution may have less of an effect. However, movement of the object may increase the number of pixels that need to be captured to detect visual details of the object.

Generally, for a given sensor under the same atmospheric conditions, the observation resolution is greater than the surveillance resolution. For example, for a sensor with 6016×4016 pixels, the surveillance resolution of the sensor is at least 1% of the total number of pixels of the sensor whereas the observation resolution is at least 35%. In embodiments, the surveillance resolution is less than (e.g., lower percentage of pixels, lower number of pixels, etc.) the observation resolution, wherein each resolution may include less than all pixels of a sensor. In embodiments, information regarding each object resolution threshold, including one or more of a surveillance resolution and an observation resolution, may be stored in memory on the drone.

In embodiments, one or more features of an object may not be detectable (e.g., indistinguishable) in a tracking mode with a surveillance resolution, but detectable (e.g., distinguishable) in an observation mode with an observation resolution. The object itself may be detected or distinguished in the tracking mode, but the features of the object may not be detected or distinguished in the tracking mode. A number of pixels in which each feature of the one or more features is captured relative to the surveillance resolution may be less than a number of pixels in which the feature is captured relative to the observation resolution in accordance with a mode of operation of the drone and corresponding regulation of the drone.

In embodiments, an object or feature may be detected by a computing device configured to determine whether the object or feature is represented in an image. For example, an object detection engine may be implemented on the computing device. The object detection engine may include one or more circuits in the computing device configured to process the image and detect (e.g., determine) whether the feature or the object is represented in recorded pixels of information in the image. In embodiments, the computing device may include one or more of a server and a drone from which the image of the object is recorded.

In embodiments, detecting an object in an image may include identifying a set of pixels in the image associated with the object. The set of pixels may include one or more pixels in the image in which the object is represented. The set of pixels may include one or more pixels in the image in which a boundary or periphery of the object is represented. The set of pixels may include a contiguous set of pixels in the image. The detection of the object may include generating an output indicative of the identified set of pixels. For example, the output may include locations in the image of the identified set of pixels information. In another example, the output may include a number of pixels in which the object is represented in the image (e.g., object resolution). In embodiments, the output may identify the set of pixels without or independent of indication of content of the set of pixels, aside from an indication that the identified set of pixels are associated with a same object. In embodiments, an object resolution of the object may be determined in accordance with the detection of the object in the image.

In embodiments, detecting an object may include identifying a set of pixels for the object in a sequence of images. An input may be received to select the object in a first image of the sequence of images. The input may include an input from a user interface device. The input may include a location of the object in an image prior to the first image. In accordance with the input, detecting the object may include identifying a set of pixels in the first image associated with the object. Responsive to the detection of the object in the first image, an output indicative of the identified set of pixels for the object in the first image may be generated. For example, the output may include a location of the object in the first image. In embodiments, the output may be provided as input for detection of the object in a second image of the sequence of images, the second image subsequent the first image. In accordance with an input for the second image, a second set of pixels associated with the object may be identified in the second image. The input for the second image may include a same input as the input for the first image or an output generated from the detection of the object in the first image. In embodiments, the identification of a set of pixels for the object may be repeated for each image in the sequence of images. In embodiments, a surveillance resolution or object resolution threshold for a tracking mode of a drone may be set equal or greater than a number of pixels for the detection of the object in the sequence of images. In embodiments, identifying the set of pixels for the object in the sequence of images may require or otherwise be associated with a greater number of pixels than detecting the object in a single image. The object may be detected in accordance with a first number of pixels in the single image, but tracking the object in a sequence of images may involve a second, higher number of pixels, such as defined by the surveillance resolution or object resolution threshold of the tracking mode of the drone.

In embodiments, detecting an object in an image may include generating an indication of content of a set of pixels associated with the object detected in the image. The indication of content may include a category or type of object of the detected object. The indication of content may be generated by an object detection engine configured to detect the category or type of object. If the image includes a sufficient number of pixels of information for the object detection engine to detect the category or type of object, the indication of content may be generated. For example, an object detection engine configured to detect bicycles may provide an indication of content including a label of "bicycle" for the object when the image includes a threshold number of pixels that enable the object detection engine to determine the content of the pixels. If the image does not include a sufficient number of pixels of information for the object detection engine to determine the content of the set of pixels of the object, the indication of content may not be generated, even if the object is represented in the image. In embodiments, the object detection engine may detect an object and generate an indication of the object, separately from or independent of an additional indication of content of the detected object. In embodiments, an indication of content may not be provided for a detected object. In embodiments, an observation resolution or observation resolution threshold may be selected in accordance with a minimum number of pixels associated with generating the indication of content for the detected object.

In embodiments, detecting an object may include detecting a feature of the object. Detecting the feature may include one or more of identifying a set of pixels associated with the feature, identifying a set of pixels for the feature in a sequence of images, and generating an indication of content of a set of pixels for the feature. Detecting the feature may include one or more operations or elements as discussed above with respect to the detection of an object.

A drone may track and/or observe more than one object at a time. One or more objects may be selected for tracking and/or observing in any manner. As long the image of each object is captured with at least the surveillance resolution or the observation resolution, two or more objects may be tracked and/or observed by a drone at the same time. However, if the objects move apart from each other, so that the number of pixels of each object in the image decreases to below the surveillance resolution or the observation resolution, then the drone may cease tracking at least some of the objects to continue tracking a subset, possibly just one, of the objects to achieve the desired object resolution.

Determining which objects to cease tracking or observing and which objects to continue tracking or observing may be accomplished in any manner. For example, if an officer selects objects for tracking, the officer may prioritize the objects. Prioritized object may include at least one first object associated with a relative higher priority and at least one second object with a relative lower priority. In embodiments, a priority assigned to an object may be stored in memory on a drone. If all selected objects cannot be tracked and/or observed at the same time, the drone ceases tracking and/or observing lower priority objects first. The drone ceases to track and/or observe additional lower priority objects until the surveillance resolution and/or observation resolution may be met for the remaining objects.

A drone may move, autonomously or partially autonomously, to track (e.g., surveil, follow) or observe an object while communicating. A drone may move, autonomously or partially autonomously, to track an object while communicating and operating in a stealth mode. Changes in position (e.g., one dimensional, two dimensional, three dimensional) to track and/or observe an object may affect communication and/or stealth mode operation. A predetermined rate for communicating data between a drone and a server may be needed to communicate data between the drone and the server while tracking and/or observing an object. Movement of the drone to track and/or observe the object may decrease the rate of communication below a predetermined threshold. Movement of a drone to increase the rate of communication may affect the ability of the drone to track and/or observe (e.g., captures images of object with minimum object resolution) an object. Movement of the drone may further affect the ability of the drone to operate in a stealth mode because movement of the drone toward or away from the object may increase or decrease the sound of the drone as perceived by the object (e.g., target, suspect, person) and thereby increase or decrease the likelihood that the target will detect (e.g., notice, see, hear) the drone. A drone, according to various aspects of the present disclosure, may autonomously (e.g., automatically), without human intervention, control its position to find a balance between surveillance/observation, communication and operation in the stealth mode.

Data communication rates may be measured in bits per second or bytes per second. The following abbreviations for data rates, used herein, are: kbps, kBps, Mbps, and MBps for kilobits per second, kilobytes per second, megabits per second, and megabytes per second respectively. As used herein, the term byte is eight bits.

In an implementation, a threshold rate for communication may be the rate at which a drone may transmit video as captured by a camera in real-time (e.g., live-streaming, streaming) to a server. In an implementation, the rate of communication for live-streaming video is at least 5 Mbps. The threshold communication rate for a drone to transmit live-streaming video to a server is referred to herein as the live-stream communication rate threshold. In embodiments, the live-stream communication rate threshold may include a rate equal or greater than a minimum rate at which live-stream video data is required to be transmitted in order to avoid disruption or other playback error while subsequently viewing the live-stream video data via the server. In an implementation, the threshold rate for communication may be the rate at which a drone may send one or more still images at the beginning of an incident or at various times during an incident. An incident may include a situation in which officers of a security agency track or observer a suspect of a crime. A data rate for transmission of occasional high resolution still images from the drone to a server may range from 1 Mbps to 2.4 Mbps at various times and 284 kbps to 1 Mbps for receiving information from the server.

Autonomous flight for a drone, according to various aspects of the present disclosure, includes flying in accordance with a tracking mode, an observation mode, or a stealth mode while attempting to meet a communication criterion (e.g., minimum communication rate), an object resolution criterion (e.g., minimum object resolution) and/or the sound criterion (e.g., maximum sound intensity level of the sound produced by the drone as perceived by the object) as discussed below. A mode of flight may be specified (e.g., selected, commanded) by a user of a drone. A user may determine whether a drone should track an object, observe an object, or operate in accordance with a stealth mode while tracking an object. Once a user has selected a mode of operation, the drone may autonomously control its flight (e.g., movement in three dimensions) to fulfill (e.g., meet, accomplish) the criteria of the mode of operation and the requirements for communication.

In embodiments, each mode of operation of a drone may include one or more criteria. Each criterion of the one or more criteria may include a value. Information indicative of each criterion of the one or more criteria may be stored in memory of the drone prior to execution of a corresponding mode of operation by the drone. Data representing the one or more criteria may be provided to (e.g., stored on, communicated to, etc.) the drone and retained by the drone in one or more non-transitory, computer-readable storage media of the drone. The drone may apply the one or more criteria to regulate the drone, including a position, altitude, zoom factor, or other variable, feature, or state of the drone.

In embodiments, one or more criteria associated with a mode of operation of a drone may include one or more of a communication criterion, an object resolution criterion, and/ or a sound criterion. The communication criterion may include a minimum communication rate or communication rate threshold. The object resolution criterion may include a minimum object resolution or object resolution threshold. The sound criterion may be a perceived sound criterion and may include a sound intensity level threshold or a maximum sound intensity level of the sound produced by the drone. A maximum sound intensity level of the sound criterion may include a maximum sounds intensity level of the drone as perceived by the object.

In embodiments, a first mode of operation may include one or more different criteria relative to a second mode. The first mode of operation may exclude a criterion or have a criterion that is undefined relative to the second mode of operation in which the criterion is included and/or defined. For example, an observation mode may not include a sound criterion, while a stealth mode may include a sound criterion.

In embodiments, a first mode of operation may include one or more same criteria relative to a second mode. The first mode of operation may include a criterion or define a criterion that is included or defined in the second mode of operation. For example, an observation mode and a tracking mode may each include a communication criterion. In embodiments, a value of a same criterion between the first mode and second mode may further be the same. For example, a value of a communication rate threshold may be a same value (e.g., 5 MBps) for each of the first mode and the second mode. Alternately, each of the first mode and the second mode may include a same, defined criterion, but a different value. For example, an observation mode may have a first value (e.g., 5 MBps), while the tracking mode may include a second value that is less than or greater than the first value.

In embodiments, an object resolution criterion fulfilled by a drone may be selected in accordance with a mode of operation for a drone. For example, the drone may operate in a stealth mode, observation mode, and tracking mode, wherein each mode has an associated object resolution criterion. The object resolution criterion for the observation mode may include an observation resolution and the object resolution criterion for the tracking mode may include a surveillance resolution. In embodiments, the object resolution criterion for the stealth mode may include a surveillance resolution. Each object resolution criterion may be selected and used in operations of the drone upon selection of the mode of operation for the drone. For example, the object resolution criterion may be retrieved from memory of the drone and applied as part of operations for regulating the drone.

In embodiments, an object resolution criterion for each of two or more modes of operation of a drone may be a same object resolution criterion. For example, a stealth mode and a tracking mode for the drone may have a same object resolution criterion, such as a surveillance resolution. In embodiments, values associated with the same object resolution criterion (e.g., percent of pixels, number of pixels, etc.) may be same values.

In embodiments, an object resolution criterion for each mode of two or more modes of operation may include a different object resolution criterion. A first mode of operation may include a first object resolution criterion and a second mode of operation may include a second object resolution criterion, the first object resolution criterion different from the second object resolution criterion. For example, a tracking mode may include a surveillance resolution and an observation mode may include an observation resolution. Values associated with each mode and different object resolution criterion (e.g., percent of pixels, number of pixels, etc.) may be different.

In the tracking mode, as discussed above, a drone moves to track (e.g., follow) the movements of an object while maintaining the object resolution in the images from the camera at or above the surveillance resolution. As further discussed above, the surveillance resolution depends, at least in part, on the sensor used by the camera to capture images. The drone further positions itself to communicate at a rate that is at or above a threshold, for example at or above the live-stream communication rate threshold. In the tracking mode, the drone positions itself without concern as to the sound intensity level (e.g., loudness, strength) of the sound (e.g., noise) produced by the drone as perceived by the target. In the tracking mode, it is immaterial as to whether the object notices (e.g., is aware of) the drone. In the tracking mode, the drone may communicate with a server via base stations in the area where the drone operates. In other words, in the tracking mode, the drone may track the movements of the object, maintain the surveillance resolution of the object in the images from the camera, and communicate with a server at or above a communication rate threshold. However, in the tracking mode the drone does not have to meet a sound criterion.

In the observation mode, as discussed above, a drone moves to observe visual details of an object while maintaining the object resolution in the images from the camera at or above the observation resolution. As the object moves, the drone tracks the movements of the object to maintain the observation resolution of the object in the images from the camera. As further discussed above, the observation resolution depends, at least in part, on the sensor used by the camera to capture images. The drone further positions itself to communicate at a rate that is at or above a threshold. The drone does not position itself to meet a sound criterion for the sound intensity level of the sound produced by the drone as perceived by the target. In the observation mode, the drone may communicate with a server via base stations in the area where the drone operates. Images with visual details are transmitted to a server for possible analysis and/or detection. The result of analysis and/or detection may be reported to the drone and/or an officer at the incident where the drone is operating. The result of analysis and/or detection may be communicated to the officer via the drone. In other words, in the observation mode, the drone may track the movements of the object, maintain the observation resolution of the object in the images from the camera, and communicate with a server at or above a communication rate threshold. However, in the observation mode the drone but does not have to meet a sound criterion.

Sound intensity level is the level of the intensity of a sound relative to a reference value and is expressed in decibels (dB). The reference value is equivalent to the lowest sound intensity detectable by an undamaged human ear under room conditions, which is generally expressed as 0 dB or in other words the threshold of human hearing at 1000 hertz In the stealth mode, as with the tracking mode and observation mode, a drone moves to track (e.g., follow) the movements of an object while maintaining the object resolution in the images from the camera at or above the surveillance resolution. In the stealth mode, the drone stays far enough away from the object as needed to meet a sound criterion while maintaining the object resolution in the camera images at or above the surveillance resolution. The sound criterion means that the sound (e.g., noise) produced by the drone is less than or equal to a sound intensity level (e.g., 10 dB, 20 dB, 30 dB) threshold. In embodiments, the sound produced by the drone (e.g., sound intensity level of the drone) equals to a sound intensity level of the drone as perceived by the target. In the stealth mode, the drone further positions itself to communicate at a rate that is at or above a communication rate threshold.

In the tracking mode, the object resolution in an image must be at least the surveillance resolution. The drone may move closer to the object thereby exceeding the surveillance resolution of the object in an image. Moving closer to the object increases the sound intensity level of the drone as perceived by the object, but in the tracking mode exceeding a sound intensity level threshold is unimportant as long as the communication rate is maintained.

In the stealth mode, the drone needs to maintain the object resolution at above the surveillance resolution and the communication rate at or above the communication rate threshold, but the drone must also position itself far enough away from the object so that the sound intensity level of the sound generated by the drone as perceived by the object on the ground is less that a threshold. If the drone cannot meet the object resolution requirement while positioning itself far enough away to meet the sound intensity level threshold as perceived by the target, then the drone cannot operate in the stealth mode. However, many cameras carried by drones include zoom factors that allow the drone to meet the object resolution requirement from a distance by merely zooming in on the object.

In an implementation, the sound intensity level threshold is 30 dB, which means that the sound generated by the drone as perceived by the target is no more than 30 dB. The sound intensity level threshold in the stealth mode reduces the likelihood that a person (e.g., object) on the ground, including a suspect that is being tracked, will notice the drone. Keeping the drone farther away from the object also reduces the visual profile of the drone and the sound of the drone at the ground. A person (e.g., target) may detect the presence of a drone either by seeing the drone or hearing the drone. The sound of a drone may alert a person of its presence so that the person visually searches for the position of the drone. Increasing the distance between the target and the drone decreases the likelihood of a person detecting the drone. As a drone moves away from a target, the size of the drone as perceived by the target decreases thereby making it more difficult to detect visually. As a drone moves away from a target, the noise (e.g., sound) produced by the drone, as perceived by the target, decreases thereby making it less noticeable. A drone may move farther away from an object by increasing its altitude or by moving away from the object at any altitude.

Positioning the drone with respect to a target, as discussed below, may also increase the likelihood that the target will not detect the drone.

In an implementation, a drone operates in the tracking mode while the camera of the drone maintains the object resolution in the image at or above the surveillance resolution and communicates at or above the communication rate threshold regardless of the sound intensity level of the noise of the drone as detected by the target. A drone operates in the stealth mode while the camera of the drone maintains the object resolution in the image at or above the surveillance resolution, communicates at or above the communication rate threshold and positions itself a distance from the target so that the noise generated by the drone as perceived by the target is less than or equal to a sound intensity level threshold.

For example, in the tracking mode, the drone autonomously moves to meet both the surveillance resolution and the communication rate criteria. In the stealth mode, the drone autonomously moves to meet the surveillance resolution, communication rate criteria, and sound intensity level threshold as perceived by the target. In other words, a drone in the stealth mode meets the surveillance resolution criterion, the communication rate criterion, and a perceived sound criterion (e.g., sound intensity level threshold). In an implementation, the perceived sound criterion is less than or equal to 30 dB (e.g., quiet home). In another implementation, perceived sound criterion is less than or equal to 20 dB (e.g., a whisper at 1 meter). In another implementation, perceived sound criterion is less than or equal to 10 dB (e.g., rustle of leaves).

In an implementation, a drone that is positioned about 300 feet from the target will produce a sound that is perceived by the target to be about the perceived the sound criterion (e.g., 30 dB, 20 dB, 10 dB). As the drone moves closer to the target, the sound of the drone as perceived by the target increases to more than the perceived the sound criterion, so while the drone is positioned less than 300 feet from the target the drone cannot operate in the stealth mode. As the drone moves away from the target, the sound of the drone as perceived by the target decreases to less than the perceived the sound criterion, so while the drone is positioned more than 300 feet from the target the drone may operate in the stealth mode as long as it meets the surveillance resolution and communication rate criteria.

A drone may operate in the stealth mode by positioning itself a distance away from the target so that the sound produced by the drone as perceived by the target is less than the perceived sound criterion regardless of the distance between the drone and the target. For example, a drone operating in a noisy environment may be physically closer to the target than a drone operating in a quiet environment, yet the sound intensity level as perceived by the target is less than the perceived sound criterion.

A drone may determine the sound intensity level as perceived by the target in any manner. Methods that may be used by a drone to determine the sound intensity level as perceived by the target may include (1) determining a distance between the drone and the target, determining a sound intensity level of the drone at the drone, and estimating the attenuation of the sound that travels from the drone along the distance to the target to estimate the sound level intensity level at the target; (2) determining a distance between the drone and the target, detecting soundwaves from the drone that are reflected from the ground, measuring the sound intensity level of the reflected waves at the drone, and estimating the attenuation of the sound of the reflected soundwaves from the ground along the distance to the drone to estimate the sound level intensity at the target; (3) using a sensor to measure the sound intensity level of the sound of the drone at or near the target and transmitting the sound intensity level as measured by the sensor to the drone; (4) using a sensor to measure the sound intensity level of background (e.g., environmental) noise at or near the target, transmitting the sound intensity level of background noise to the drone, determining a distance between the drone and the target, determining a sound intensity level of the drone at the drone, estimating the attenuation of the sound that travels from the drone along the distance to the target to estimate the sound level intensity at the target, ensuring that the sound intensity level at the target is less than the sound intensity level of the background. In embodiments, methods may include one or more elements, features, operations, or steps of the above methods, including subsets and/or combinations of elements, features, operations, or steps of these methods.

The above methods for determining the sound intensity level as perceived by a target are discussed further below. Some of the above methods detect the sound level intensity of the sound produced by the drone at (e.g., proximate to, near) the drone. Any method may be used to detect the sound intensity level of the drone at the drone. For example, a drone may include a microphone positioned proximate (e.g., on, next to) to the drone that detects the sound produced by the drone. The microphone may detect the sound and report a sound level intensity of the drone, for example to a processing circuit of the drone. The microphone may periodically (e.g., continuously, regularly) detect the sound level intensity of the drone so that as the rotor speed increases and the sound intensity level changes, a new value for the sound intensity level is reported by the microphone. In another example, a drone may include a table stored in memory that relates rotor speed to the sound level intensity of the sound produced by the drone. A processing circuit of the drone may detect the rotor speed, look up the sound intensity level related to the rotor speed, and report the sound intensity level of the drone at the drone. The processing circuit may monitor rotor speed periodically and report an updated sound intensity level responsive to a change in rotor speed. A processing circuit in a drone may control, at least in part, the rotor speed and may report an updated sound intensity level of the drone each time rotor speed is changed.

Some of the above methods determine a distance between the drone and the target. Any method may be used to determine the distance between the drone and the target. For example, a drone may include a laser rangefinder. As the drone tracks a target, the drone may use the laser rangefinder to determine the distance between the drone and the target. In another example, personnel on the ground may have a laser rangefinder. The personnel on the ground may use the laser rangefinder to determine a distance between the drone and the personnel and report that distance to the drone for use as the distance between the drone and the target. In another example, a drone may include a GPS receiver and topographical map information. The GPS receiver may report the altitude and geographic location of the drone. The drone may use the geographic location and topographical map to determine the altitude of the ground at the geographic location of the drone. The drone may subtract its altitude as reported by the GPS receiver from the altitude of the ground where the drone is located as determined using the topographical map. The difference in altitude may be used as the distance between the drone and the target. In another example, security personnel may report the geographic location of the target to the drone. The drone may use its own geographic location as reported by the GPS receiver on the drone and the topographical map information stored in memory to determine a distance between the drone and the target. In another example, a target may be tagged with a tracking device the reports the geographic location and altitude of the target. The target location and altitude information may be reported to the drone. The drone may use its geographic location and altitude as reported by a GPS receiver to determine the distance between the drone and the target.

Returning to the methods for determining sound intensity level of the drone as perceived by the target. In the first method identified above, the drone determines a distance between itself and the target. As discussed above, any method may be used to measure or estimate the distance between the drone and the target or the drone and a location proximate to the target. The drone determines the sound intensity level of its own operation. As discussed above, any method may be used by the drone to determine its own sound intensity level. The drone may use a mathematical model that estimates the attenuation of sound along the distance from the drone to the target. The drone uses its own sound intensity level as the sound intensity level of the source of the sound. The mathematical model may assume that the sound wave that results from the operation of the drone expands spherically as it travels away from the drone. As the surface area of the spherical sound wave increases, the sound intensity of the wave decreases (e.g., sound intensity level inversely proportional to distance). As a result, the further the sound wave travels away from the drone the more its sound intensity level decreases.

The drone may use mathematical model and the distance between the drone and the target to estimate the amount attenuation from the drone to the target. The drone may subtract the amount attenuation from its own sound intensity level to determine the sound intensity level as perceived by the target. The drone may further have (e.g., stored in memory, received by transmission) a sound intensity level threshold (e.g., perceived sound criterion). If the estimated sound intensity level as perceived by the target is greater than the sound intensity level threshold, the drone knows that is too close to the target and must move further away. If the estimated sound intensity level as perceived by the target is less than or equal to the sound intensity level threshold, the drone knows that it is far enough away from the target to meet the perceived sound criterion. Responsive to comparing the estimated sound intensity level as perceived by the target to the sound intensity level threshold, a drone may autonomously move so that the sound intensity level as perceived by the target is equal to or less than the sound intensity level threshold.

In the second method identified above, the drone determines the distance between itself and the target. The drone detects its own sound waves that have traveled from the drone and reflected off the ground back to the drone. Detecting reflected sound waves may use any suitable signal processing techniques. The sound produced by the drone may include encoded signals to make isolating reflected sound waves easier. After identifying a reflected sound wave, the drone measures the sound intensity level of the reflected wave. The drone may use a mathematical model, such as one discussed above, to determine the amount of attenuation of the reflected signal from the target to the drone. The drone may add the measured sound intensity level of the reflected wave to the estimated attenuation to get the value of the sound intensity level of the wave at the target. As discussed above, the drone may determine whether the sound intensity level as perceived by the target is greater than, equal to or less than a sound intensity level threshold. Responsive to comparing the sound intensity level as perceived by the target to the sound intensity level threshold, the drone may move to increase, maintain, or decrease the distance between the drone and the target so that the sound intensity level as perceived by the target is less than or equal to the sound intensity level threshold.

In the third method identified above, sensors located at or near the target detect and measure the sound generated by the drone. Any signal processing techniques may be used to isolate the sounds generated by the drone from background and environmental sounds. The sound intensity level of the sound from the drone at or near the target is transmitted to the drone. A sound intensity level of the drone may be determined in accordance with the measured sound intensity level. For example, the sound intensity level of the drone may be set equal to, greater than, or less than the measured sound intensity level. The drone may compare the measured sound intensity level to a sound intensity level threshold and move in accordance with the comparison as discussed above.

Sensors may be positioned at any location on the ground, preferably proximate to the target. Sensors may be deployed on the ground at the time the drone is released to perform surveillance and/or tracking. Sensors may be placed in or on equipment carried by security personnel at the scene of the incident. For example, a body camera may include a sound sensor. A weapon (e.g., conducted electrical weapon, pistol, shot gun, baton) may include a sound sensor. Any method of communication may be used to transmit the sound intensity level as measured by the sensors to the drone. For example, the radio channel used to relay instructions to control the drone may carry the information measured by the sensors. A sensor may provide information to any system (e.g., camera, in-vehicle computer, server) that communicates with the drone so that the measured sound information may be transmitted to the drone.

The fourth method identified above is similar to the first method except the sound level intensity threshold is measured on the ground at or near the target and transmitted to the drone. In the fourth method, sensors positioned on the ground at or near the target measure the sound intensity level of the background (e.g., environmental) noise at or near the target. The sound intensity level of the background noise at or near the target becomes the sound intensity level threshold for the sound from the drone as perceived by the target. The sound intensity level threshold may be set (e.g., selected, determined, recorded, calculated) in accordance with the sound intensity level of the background noise at or near the target. For example, the sound intensity level threshold may be set equal or less than the sound intensity level of the background noise at or near the target. A value for the sound intensity level of the drone in accordance with the measured sound intensity level may be stored in memory of the drone and used in subsequent regulation of the drone. In this method, the sensors measure the sound intensity level of the background noise at or near the target. The sensors may be deployed or positioned as discussed above with respect to the third method. The sound intensity level of the background noise is transmitted to the drone. Transmission of the sound intensity level to the drone may take place in any manner, for example the methods discussed with respect to the third method. The drone determines the distance between itself and the target. The drone determines its own sound intensity level. Using the distance between the drone and the target, the drone estimates the sound level intensity of the sound from the drone by the time it reaches the target. As discussed above, the drone may estimate the attenuation of the sound from the drone across the distance between the drone and the target. The drone then subtracts the amount attenuation from the sound intensity level of the drone to estimate the sound intensity level as perceived by the target. The drone compares the estimated sound intensity level as perceived by the target to the sound intensity level of the background noise as measured by the sensors on the ground. The drone moves in accordance with the comparison. For example, if the estimated sound intensity level as perceived by the target is greater than the sound intensity level of the background noise at or near the target, then the drone knows that it is too close to the target and should move further away. If the estimated sound intensity level as perceived by the target is less than or equal to the sound intensity level of the background noise, the drone knows that it is far enough away from the target.

In embodiments, the sensors may include at least one remote sensor in wireless communication with the drone. The drone may receive a measured sound intensity level of the drone from the remote sensor via a wireless communication link between the drone and the remote sensor. The remote sensor may include a remote microphone. The remote sensor may be integrated with one of a body worn camera and a vehicle-mounted camera. The wireless communication link may be established directly between the drone and the remote sensor. For example, the drone may include a communication circuit by which the measured sound intensity level from the remote sensor may be received. Alternately, the wireless communication link may be established via a base station, wherein the remote sensor provides the measured sound intensity level to the base station via a communication link and the wireless communication is provided between the base station and drone, enabling the base station to forward the measured sound intensity level to the drone.

In embodiments, a sound intensity level threshold may be determined dynamically in accordance with a measured sound intensity level. For example, the sound intensity level threshold may be increased when the measured sound intensity level increases and/or the sound intensity level threshold may be decreased when the measured sound intensity level decreases. The measured sound intensity level may include one or more of a sound intensity level measured at the drone and a sound intensity level measured near or at an object. The measured sound intensity level may be received periodically by the drone over time. The sound intensity level threshold may be adjusted over time in accordance with changes of the measured sound intensity level, thereby accounting for changing background noise levels and/or sound intensity levels of the drone itself. The sound intensity level of the drone may be automatically determined in accordance with the measured sound intensity level. The sound intensity level of the drone may selectively change or not change based on the measured sound intensity level, independent of input from another computing device, aside from the measured sound intensity level.

The above methods may be used by a drone to determine whether the sound intensity level as perceived by the target is greater than, equal to or less than a threshold. Based on the sound intensity level as perceived by the target, the drone may move so that the sound intensity level at or near the target increases or decreases. The drone may compare the sound intensity level as perceived by the target to a preprogrammed threshold or to the sound intensity level of the background noise as measured at or near the target. The drone may autonomously move in accordance with the comparison.

Positioning the drone outside of the normal field of view of a target further decreases the likelihood that the target will detect the drone. The vertical field of view of a human being is about 50 degrees above horizontal and 70 degrees below horizontal. Positioning the drone directly (e.g., 90 degrees from horizontal) over the head of the target positions the drone outside of the vertical field of view of the target thereby decreasing the likelihood that the target will see the drone. Because the upper field of view goes from 0 degrees (e.g., horizontal) to about 50 degrees, a drone may be positioned between 50 degrees and 90 degrees, preferably 55 degrees to 90 degrees, over the head of the target and still be outside the vertical field of view of the target. If the sound intensity level of the drone as perceived by the target is less than the perceived sound criterion, the target may not be alerted by the sound of the drone to look up in search of the drone.

Figure 8:
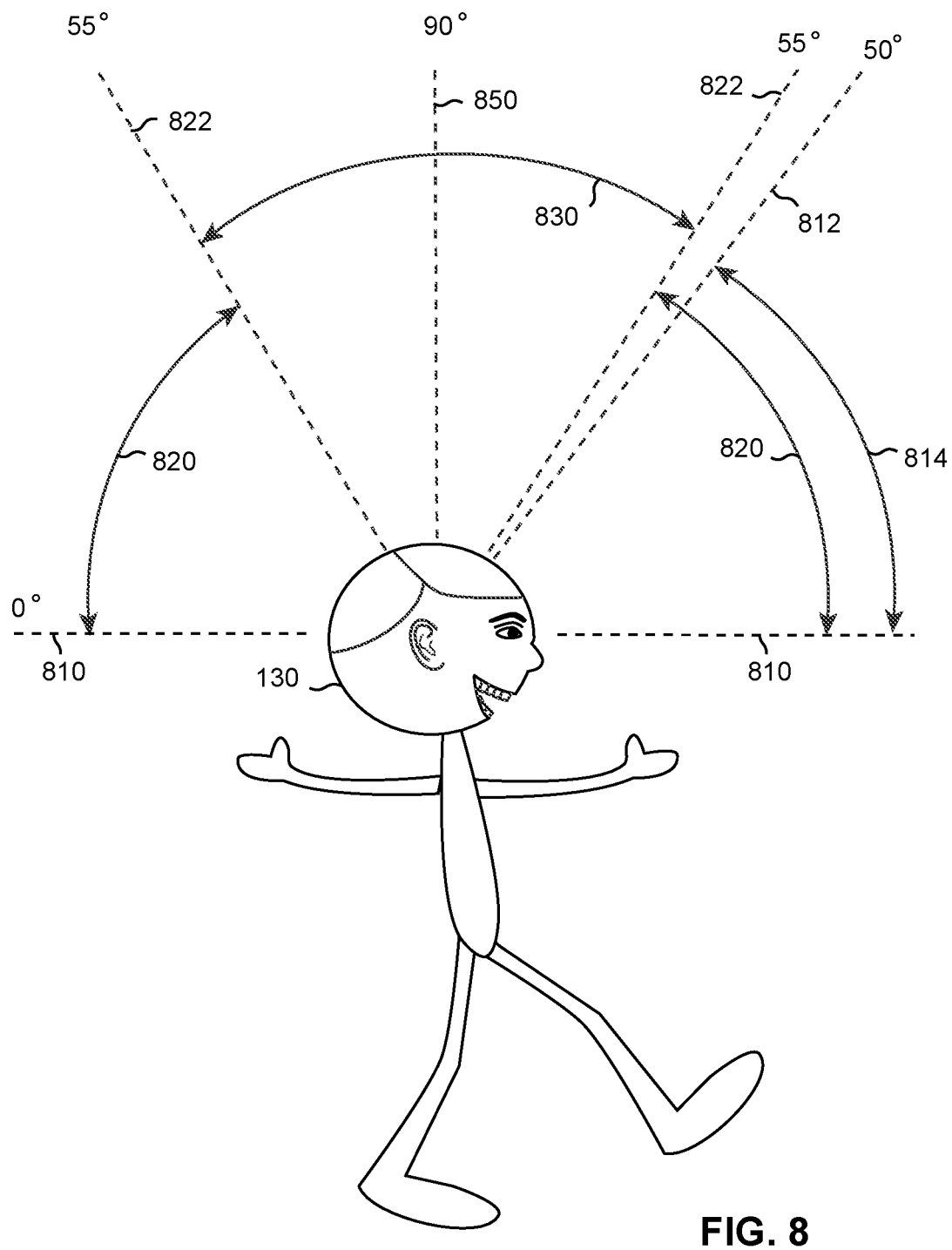
FIG. 8 is a diagram of a range of vision of a person.

For example, target 860 in FIG. 8 is looking ahead at zero degrees (e.g., line 810). The vertical field of view of target 860 extends from zero degrees (e.g., line 810) to 50 degrees (e.g., line 812) as indicated by angle 814. As long as target 860 continues looking ahead, it is unlikely that target 860 will notice objects positioned between 55 degrees (e.g., line 822) and 90 degrees (e.g., line 850) as indicated by angle 830. Preferably, a drone operating in the stealth mode may fly between 55 and 90 degrees over the head of the target to reduce the likelihood of being detected.

In embodiments, a drone may determine an angular position between an object and compare the angular position relative to an angular position threshold. In accordance with the comparison, the drone may change a position (e.g., altitude, latitude, longitude, etc.) of the drone relative to the object. The drone may change its position until the angular position of the drone meets a predetermined relationship relative to the angular threshold. The predetermined relationship may include the angular position of the drone being equal or greater than the angular threshold. For example, the drone may change its position until the angular position exceeds an angular threshold of 55 degrees from a ground or surface on which the object is located. The angular position may be determined and the comparison may be made in an ongoing manner, accounting for relative changes in position between the drone and the object over time.

In the event that a drone cannot meet the object resolution (e.g., surveillance resolution, observation resolution) and communication rate requirements or stealth mode requirement at the same time, a choice may be made between maintaining object resolution, communication, or stealth. In an implementation, tracking and/or observing the object is given a higher priority than maintaining the rate of communication above a threshold and/or stealth. In the event that the rate of communication drops to zero while tracking and/or observing, the video data captured by the camera of the drone may be stored in a memory of the drone for later transfer. In the event that the rate of communication is less than the threshold, but greater than zero, the drone may transmit some video data while storing the remainder for later transfer. When the communication rate is restored to a rate above the communication rate threshold, the drone may transmit video data from the point when communication was lost or reduced or it may retain stored data for later transmission and transmit currently captured data.

In another implementation, maintaining the communication rate of the drone is given a higher priority than object resolution and/or stealth. In this scenario, the drone moves to maintain communication at or above a threshold while attempting to keep the object resolution at or above the minimum for the mode of operation.

In another implementation, maintaining stealth so that the sound intensity level as perceived by the target is less than the perceived sound criterion is given a higher priority than object resolution and/or communication rate. In this scenario, the drone moves to maintain the sound intensity level as perceived by the target less than the perceived sound criterion while attempting to maintain object resolution of the object being tracked at or above the surveillance resolution and the rate of communication above a threshold. However, assigning stealth over object resolution may inhibit the drone from tracking the target, because if the drone must move a long distance away from the object to maintain the sound intensity level as perceived by the object less than the perceived sound criteria, the drone may not be able to detect and/or track the object in the images taken by the camera.

Situation 100 of FIG. 1 may be used to provide examples of the operation of a drone in accordance with the above modes (e.g., tracking, observation, stealth) while communicating. Situation 100 occurs in an area where in an incident is in progress. Police officers received a tip that suspect 130 would attempt to retrieve pile of money 136. The officers sent drone 120 to surveil the situation. The position of the officers is not show in FIG. 1.

Pile of money 136 and suspect 130 are positioned in a valley at the base of mountains 102, 104, and 106. Base stations 110 and 112 include a tower upon which one or more directional antennas are respectively situated; however, the antennas are oriented to provide coverage to adjacent valleys. Base station 110 and/or 112 provide some coverage to the valley where suspect 130 is positioned. Drone 120 may wirelessly communicate with base station 110 and/or 112 but only while drone 120 is positioned within a range of altitude. At various positions and/or altitudes, drone 120 will not be able to wirelessly communicate with base stations 110 and 112 because wireless signals 124 and 126 are blocked by terrain and cannot reach base stations 110 or 112. In situation (e.g., incident) 100, as drone 120 increases its altitude, the rate of communication between drone 120 and base stations 110 and 112 increases, up to a point.

After launching drone 120, the officers put drone 120 into the stealth mode so that they can track suspect 130 without alerting suspect 130 of their presence. The officers, in any suitable manner, select suspect 130 as the primary target for tracking and vehicle 132 as the secondary target for tracking. Because drone 120 operates in the stealth mode, it stays a distance away from suspect 130 and vehicle 132 to meet the perceived sound criterion while still capturing the images of both suspect 130 and vehicle 132 at the surveillance resolution for the camera and while communicating with base station 110 and/or 112 at or above a threshold communication rate.

Before drone 120 starts tracking suspect 130 and vehicle 132, it identifies the altitudes at which it can communicate at or above a threshold (e.g., predetermined, livestream) rate. For this example, assume that the officers want to stream the video captured by camera 122 to headquarters in real-time (e.g., live-streaming). Further assume that the minimum communication rate for live-streaming is 5 Mbps. In this example communication rate threshold 210 is 5 Mbps.

Before starting tracking, drone 120 may characterize the altitudes in the valley, or at least a portion thereof, at which the communication rate supported by base station 110 and/or 112 is at least the threshold rate. As mentioned above, the landscape (e.g., mountain 102, mountain 104, depth of valley at base of mountains 102 and 104) does not permit base station 110 and/or 112 to provide communication at a threshold rate, or possible at any rate, at all locations (e.g., three-dimensional locations).

Figure 2:
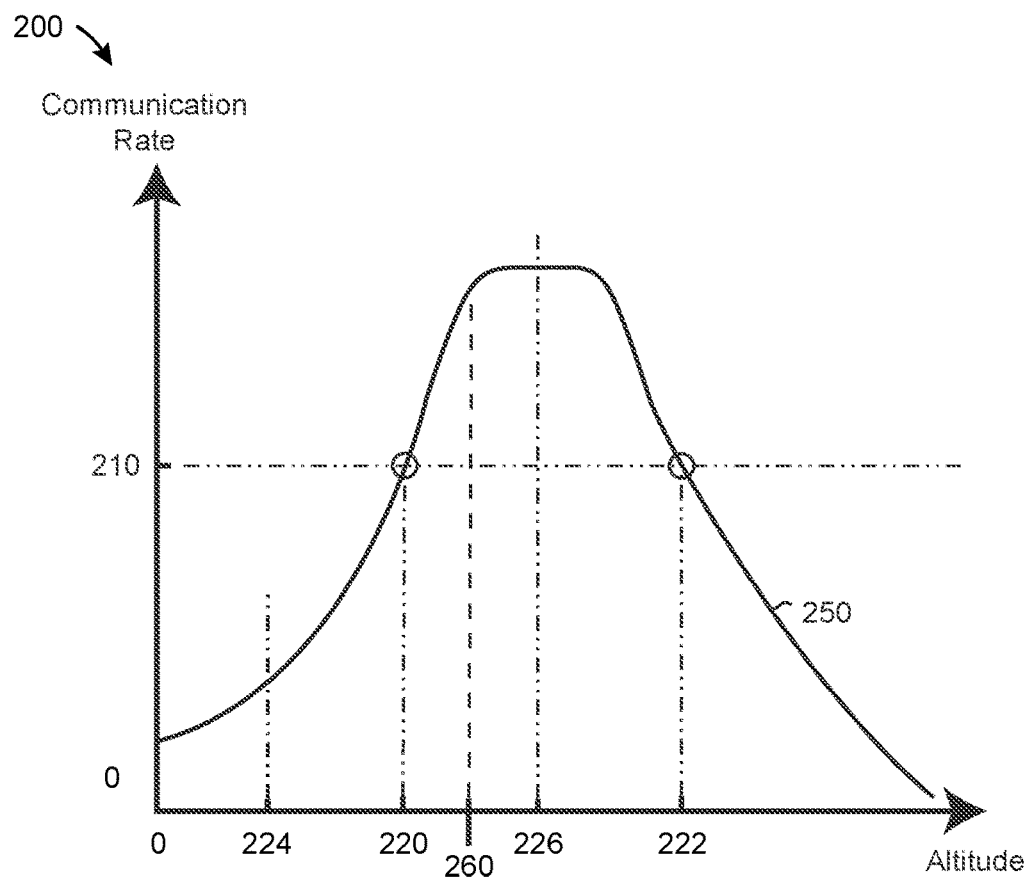
FIG. 2 is a graph of communication rate and altitude.

Graph 200 in FIG. 2 represents communication rates at various altitudes in situation 100. To characterize the communication in the valley, drone 120 may ascend from the bottom of the valley, which is altitude 224. As drone 120 ascends it attempts to establish communication with base station 110 and/or 112. Once communication is established, drone 120 (e.g., communication circuit 760, processing circuit 720) May measure the communication rate. Drone 120 records its position (e.g., altitude) and communication rate as it ascends. In another implementation, the information provided in the graph of FIG. 2 may be provided to the drone so that the drone does not need to ascend from the bottom of the valley to characterize communication rates at various altitudes.

Graph 200 shows that at altitude 224 at the geographic position (e.g., x, y; latitude, longitude, northing, easting) where the drone is launched, drone 120 may communicate with base station 110 and/or 112, but at a rate that is below threshold 210. When drone ascends to altitude 220, drone 120 detects that it can communicate at a rate that is at threshold 210. Drone 120 continues to communicate with base station 110 and/or 112 at a rate that exceeds threshold 210 as it ascends to altitude 222. At altitude 226, drone 120 notes that the rate of communication with base station 110 and/or 112 is at a maximum for that geographic position.

As drone 120 ascends above altitude 222, the rate of communication with base stations 110 and/or 112 decreases below threshold rate 210. The reduction in the communication rate above altitude 222 may be due to the fact that antennas on cell phone towers are generally directional antennas that are oriented toward the ground. Above altitude 222, the communication rate with base station 110 and/or 112 is less than threshold 210.

Because in this example, the communication rate of drone 120 with base station 110 and/or 112 needs to be greater than threshold 210, drone 120 will need to fly, if possible, at least in this vicinity of its geographic location, between altitude 220 and altitude 222.

In another implementation, drone 120 may receive from a server or have stored in memory a three-dimensional map of the area of incident 100 that identifies the communication rate at various altitudes and geographic locations. Drone 120 may use the information from the three-dimensional map to determine where it may position itself to meet the communication rate criterion.

In this example, because drone 120 is operating in the stealth mode, drone 120 must maintain a certain distance between it and suspect 130 and car 132 so that the sound intensity level as perceived by the targets is less than the perceived sound criterion (e.g., 20 dB). The drone may calculate or have available information stored in memory that instructs the drone that it must fly above altitude 260 so that the noise produced by the drone is perceived by the targets being tracked as being less than the perceived sound criteria. If drone 120 is positioned directly over suspect 130, drone 120 may not operate at an altitude of less than altitude 260 so as to maintain the distance needed to meet the perceived sound criterion from the perspective of suspect 130. Drone 120 may fly at an altitude of less than altitude 260 so long as it maintains the distance needed between drone 120 and suspect 130 so that the sound of the drone as perceived by suspect 130 is less than the sound intensity level threshold.

In this example, assume that drone 120 flies nearly directly overhead of suspect 130 while in the stealth mode. So, drone 120 operates at or above altitude 260 even though the communication criterion is met between altitude 220 and altitude 260. If the drone is commanded to switch from the stealth mode to the tracking mode, drone 120 may operate between altitude 220 and 222 while still meeting the communication criterion.

Figure 3:
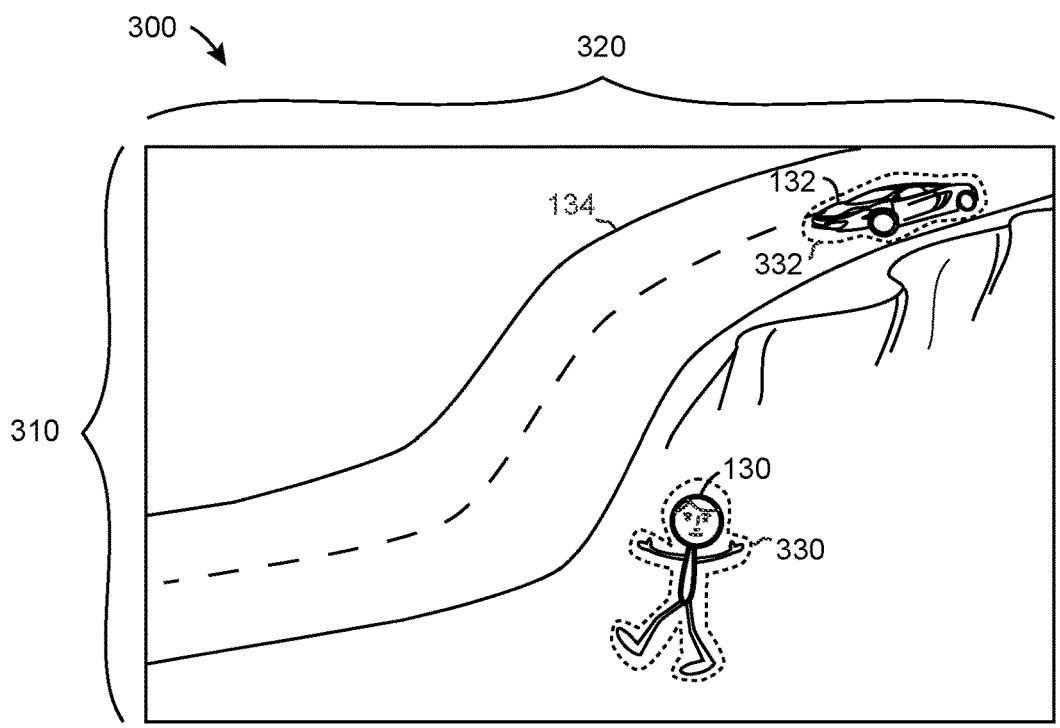
FIG. 3 is a diagram of objects in images captured by a camera.

As drone 120 begins tracking suspect 130 in the stealth mode, drone 120 ascends to at least altitude 260, so its communication rate is greater than threshold 210 while capturing images of suspect 130 and vehicle 132 at the surveillance resolution. Image 300 of FIG. 3 captures images of both suspect 130 and vehicle (e.g., car) 132. Camera 122 captures images that have height 310 and width 320. The image of suspect 130 and vehicle 132 are represented by object resolution 330 and object resolution 332 respectively. The number of pixels in object resolution 330 and object resolution 332 are each greater than the surveillance resolution.

For example, assume that height 310 and width 320 of image 300 are 4016 pixels and 6016 pixels respectively. The total number of pixels in image 300 is 24,160,256 (e.g., 24.2 mega pixels). Assume for this sensor, that the surveillance resolution is at least 1% of the total number of pixels in an image. For suspect 130 to be represented in image 300 at the surveillance resolution, object resolution 330 is at least 1% of 24.2 megapixels, so the number of pixels in object resolution 330 is at least 241,602 pixels. The same applies for vehicle 132. Object resolution 332 is at least 241,602 pixels.

Figure 4:
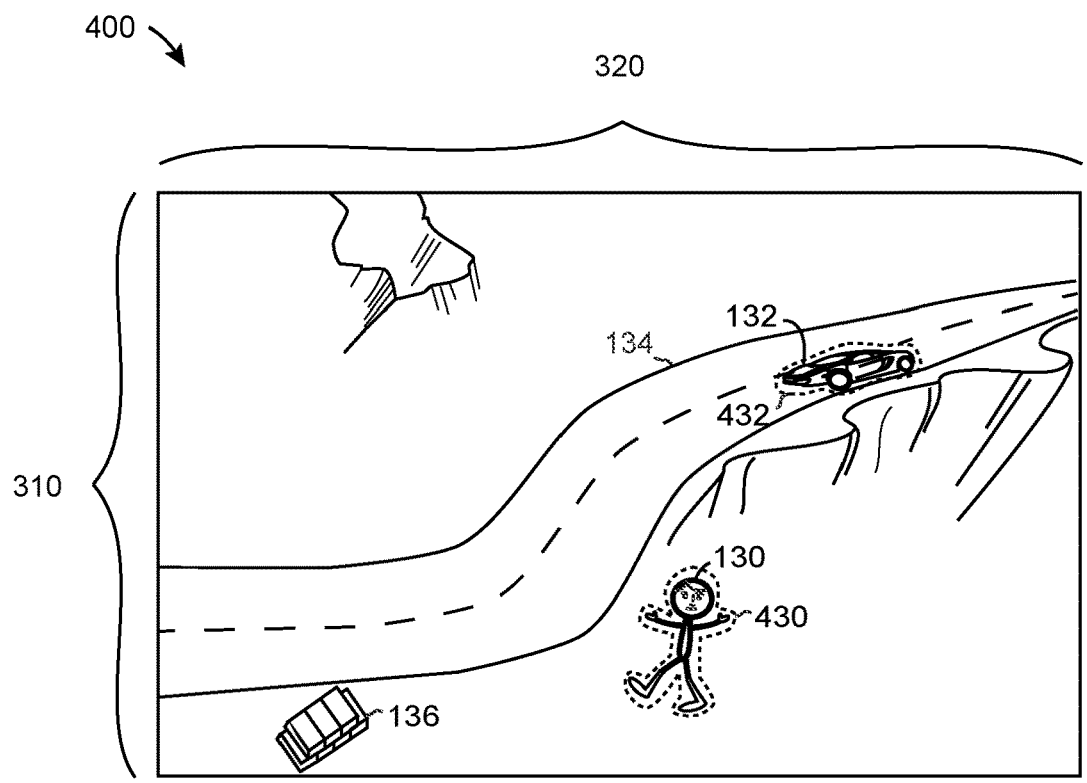
FIG. 4 is a diagram of objects in images captured by a camera.

Because vehicle 132 is moving along road 134, camera 122 may need to continually zoom out, or move farther away, to attempt to keep both suspect 130 and vehicle 132 in the image. After a while, referring to FIG. 4, because of the increasing distance between suspect 130 and vehicle 132, the object resolution 430 that represent suspect 130 and object resolution 432 that represent vehicle 132 both drop below the surveillance resolution. At this point, drone 120 cannot meet a required criteria of the stealth mode because it cannot maintain the surveillance resolution of all objects being tracked.

In this situation, drone 120 may respond in various ways. If the security personnel have prioritized the targets, drone 120 may move to continue to track the higher priority targets in the stealth mode. By tracking fewer target, drone 120 may be able to meet the surveillance resolution criterion for the fewer targets. For example, suspect 130 has been prioritized over car 132, so drone 120 may reposition itself to track only suspect 130 so that the object resolution of suspect 130 is greater than the surveillance resolution while at the same time flying above altitude 260 so that the communication rate threshold and perceived sound criteria are still met.

Assume that suspect 130 has not been prioritized over car 132 for tracking. If maintaining the communication rate has been prioritized over object resolution, drone 120 may position itself at any location as long as it flies in an altitude higher than altitude 260 to maintain stealth. Because the distance between suspect 130 and car 132 is increasing, drone 120 may not be able to track both targets at the same time because their object resolution is too small in the images provided by the camera. In this situation, because drone 120 cannot meet the requirement of tracking both targets, drone 120 may cease to track any targets and return to the location where it was launched.

Assume again that suspect 130 has not been prioritized over car 132 for tracking. If the stealth mode has been prioritized over communication, drone 120 remains above altitude 260 and may even move above altitude 222 to attempt to keep both targets in the image. Moving above altitude 222 jeopardizes communication at or above the communication rate threshold and also decreases the object resolution of suspect 130 and car 132 as a move away from each other. Prioritizing the stealth mode over communication or tracking may not permit drone 120 to track or communicate.

Assume now that security personnel have prioritized suspect 130 over car 132, so drone 120 ceases to track vehicle 132 and autonomously moves to maintain surveillance resolution of suspect 130. Because drone 120 is still in the stealth mode, drone 120 autonomously flies over suspect 130 at an altitude greater than altitude 260 while capturing images of suspect 130 at the surveillance resolution and while communicating at a rate that is equal to or greater than threshold 210.

At some point, assume that the officer is convinced that suspect 130 is aware of the presence of drone 120, so the stealth mode is no long needed. The officer may instruct drone 120 to exit the stealth mode to operate in the tracking mode. In the tracking mode, drone 120 may move below altitude 260, although it may not need to move below altitude 260 to capture images of the object at or above the surveillance resolution. In the tracking mode, drone 120 mayfly between altitude 220 and 222 to maintain communication rate at or above threshold 210. In the tracking mode, because drone 120 may move below altitude 260, the resolution of suspect 130 in an image may be significantly greater than the surveillance resolution because drone 120 is no longer in the stealth mode and attempting to conceal its presence by maintaining a minimum distance between itself and suspect 130.

As drone 120 moves to track suspect 130, drone 120 moves with respect to mountains 102 and 104. At some geographic positions (e.g., x, y; latitude, longitude) and altitudes, mountains 102 and 104 will block wireless communication signals (e.g., communication channels) 124 and 126 so that drone 120 cannot communicate with base station 110 and 112. At some positions in the valley, drone 120 may be able to communicate with base station 110 or 112, but not be able track suspect 130. At other positions, drone may be able to track suspect 130 and communicate with base station 110 and/or 112, but the rate of communication of data (e.g., speed of transfer) may be less than threshold 210.

Drone 120 autonomously maneuvers in three dimensions to try to meet the requirements for a mode. In the tracking mode, drone 120 tracks suspect 130, maintains the communication rate at or greater than threshold 210, and maintains the object resolution of suspect 130 in the camera image at or above the surveillance resolution. In the observation mode, drone 120 observes suspect 130, maintains the communication rate at or greater than threshold 210, and maintains the object resolution of suspect 130 in the camera image at or above the observation resolution. In the stealth mode, drone 120 tracks suspect 130, maintains the communication rate at or greater than threshold 210, maintains the object resolution of suspect 130 in the camera image at or above the surveillance resolution, and maintains the sound intensity level of the sound from drone 120 as perceived by the target to be less than or equal to a sound intensity level threshold.

In an implementation, when drone 120 cannot meet all the criteria of a mode, drone 120 prioritizes image capture at the object resolution of the mode (e.g., surveillance resolution, observation resolution) over communication and/or stealth. In the event that the drone 120 moves to a position where the communication rate decreases below the threshold, drone 120 continues to capture video information of suspect 130 at the object resolution for the mode while tracking or observing suspect 130. In the event that the resolution of suspect 130 in the camera image decrease (e.g., suspect 130 moves quickly) below the needed resolution (e.g., surveillance resolution, observation resolution), drone 120 may move to maintain the resolution of suspect 130 in the image even if it has to move to a position where the communication rate drops below threshold 210.

At some point during situation 100, assume that the officer determines that the additional features of suspect 130 need to be detected, so the officer instructs drone 120 to operate in the observation mode. As drone 120 moves from the stealth mode or tracking mode to the observation mode, drone 120 realizes that the object resolution of suspect 130 in the camera image does not meet the observation resolution. As a result, drone 120 moves in three dimensions to get closer to suspect 130 so that object resolution of suspect 130 in the image is at or above the observation resolution.

Figure 5:
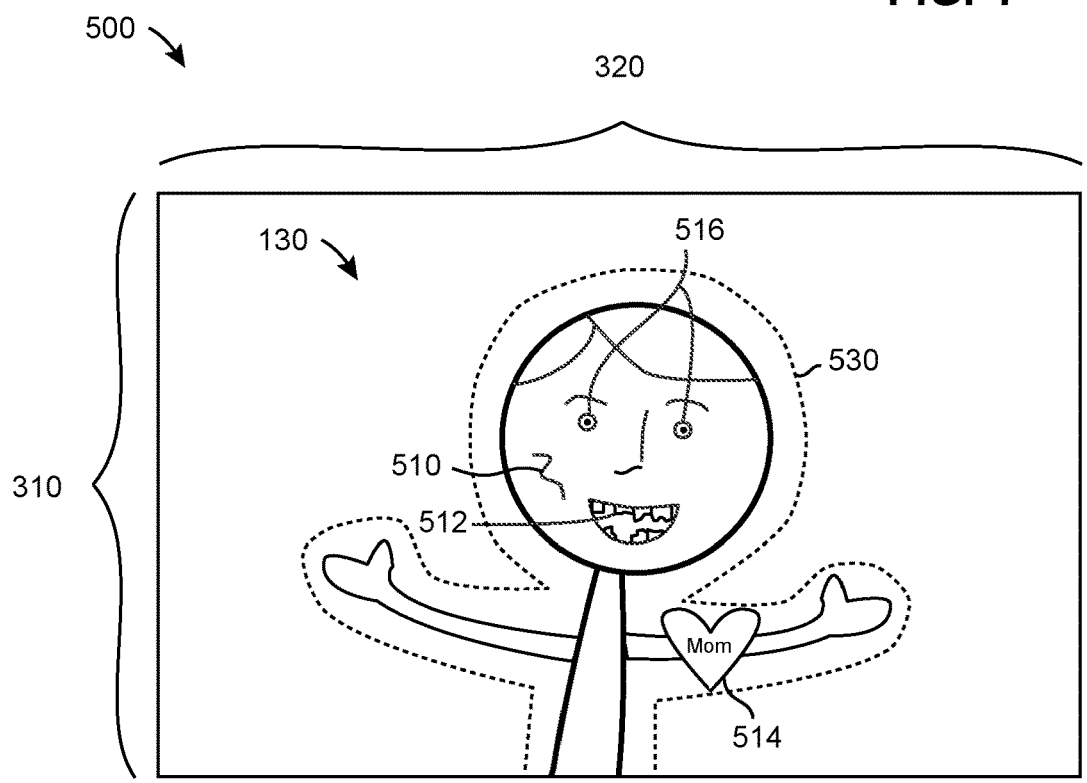
FIG. 5 is a diagram of objects in images captured by a camera.

Image 500 of FIG. 5 shows an image of suspect 130 at or above the observation resolution. Image 500, as with images 300 and 400, have height 310 and width 320. The image of suspect 130 is represented by object resolution 530. Object resolution 530 is at or greater than the observation resolution. The number of pixels that represent suspect 130 in object resolution 530 is greater than the number of pixels that represent suspect 130 object resolution 330 or object resolution 430. The number of pixels in object resolution 530 is sufficient to show visual details of suspect 130 that were not visible at lower object resolutions. In this case, the resolution of suspect 130 in image 500 permits detection of eye color 516, scar 510, irregular teeth 512, and tattoo 514. The visual details captured in the observation mode may provide information for determining whether suspect 130 is armed or determining the emotional state of suspect 130.

To capture image 500, drone 120 knows may need to move closer to suspect 130 in addition to changing its angle of orientation with respect to suspect 130. As discussed above, in the stealth mode it is preferable to fly between 55 and 90 degrees over suspect 130, to reduce the likelihood that drone 120 may be seen by suspect 130. In the tracking mode, drone 120 may also fly between 55 and 90 degrees over suspect 130 to reduce the likelihood that an object between drone 120 and suspect 130 will interrupt tracking.

In the observation mode, it is preferable for drone 120 fly at an angle less than 50 degrees to capture images with greater visual details. For example, image 500 of FIG. 5, appears to be taken at about 0 degrees (e.g., line 810) with respect to suspect 130 as shown in FIG. 8. In the observation mode, drone 120 may move to a position with respect to suspect 130 to capture images. The position of drone 120 with respect to suspect 130 may depend on the types of visual details that need to be captured.

In embodiments, images taken in the observation mode may be viewed by a user (e.g., an officer) to identify suspect 130. The images taken in the observation mode may show weapons carried by suspect 130. The images may be further viewed by a user (e.g., an officer) to determine an emotional state of suspect 130.

Assume that height 310 and width 320 of image 500 are 4016 pixels and 6016 pixels respectively. The total number of pixels in image 500, as determined above, is 24.2 mega pixels. Assume for this sensor, that the observation resolution is at least 35% of the total number of pixels in an image. In an implementation, for suspect 130 to be represented in image 500 at the observation resolution, object resolution 530 is at least 35% of 24.2 megapixels, so the number of pixels in object resolution 530 is at least 8,456,089 pixels (e.g., 8.5 mega pixels).

Images captured where an object has only the surveillance resolution number of pixels may not provide sufficient visual information for detecting details of the object. Drone 120 may move closer to an object, may change its orientation (e.g., x,y position) and/or may change (e.g., adjust) the zoom factor of camera 122 to increase the number of pixels that represent the object to capture images where the object has the observation resolution.

When drone 120 moves closer to an object to observe the object, drone 120 may move below an altitude where drone 120 can communicate with base station 110 and/or 112 at a rate that is at least threshold 210. In some situations, it is important to be able to transmit a live steam of the video data captured by camera 122, so it is important to maintain communication rate 250 above threshold 210 and the number of pixels that represent the object at least above the surveillance resolution. At times it is important to keep communication rate 250 above threshold 210 while capturing images of the object with at least the observation resolution number of pixels.

A drone, according to various aspects of the present invention, may autonomously move to capture images of an object with at least a minimum number of pixels for the object (e.g., observation resolution, surveillance resolution) while maintaining a communication rate at or above a threshold rate for communication.

Figure 6:
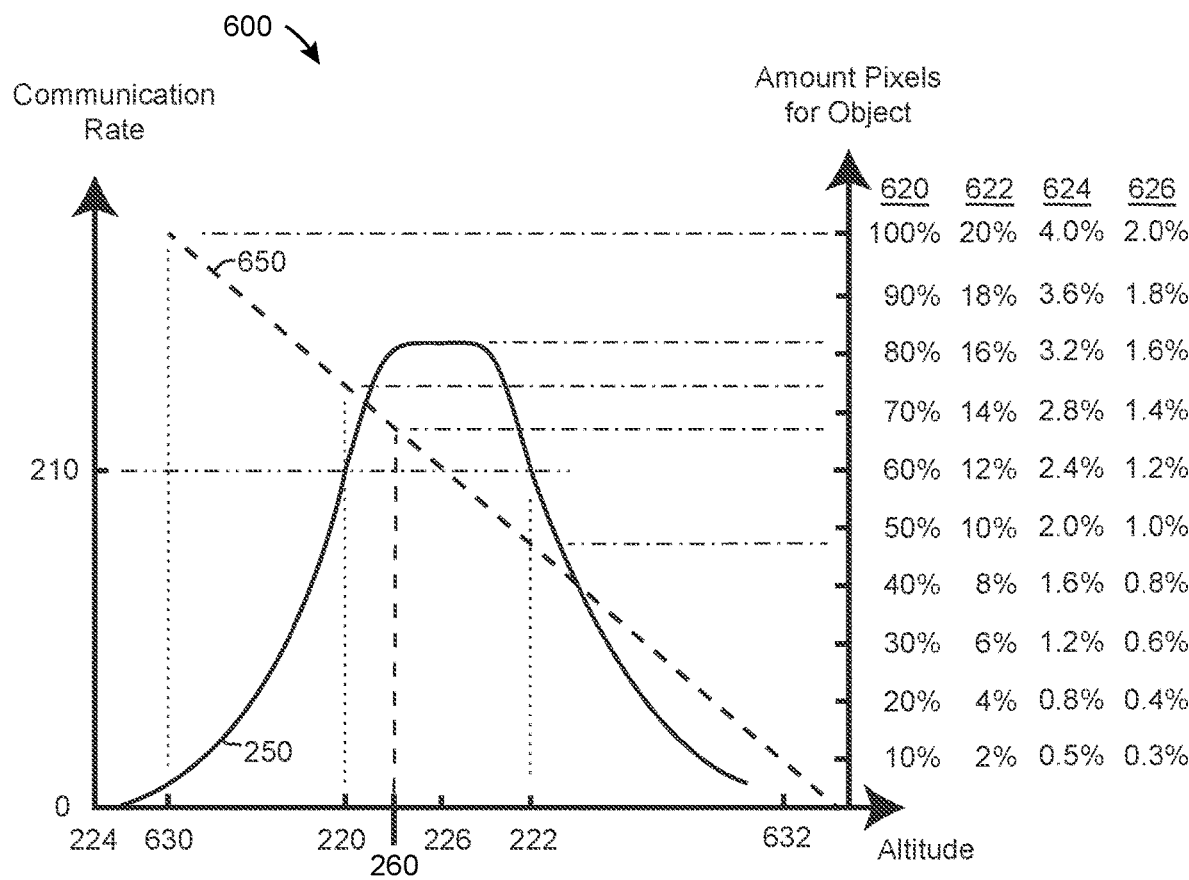
FIG. 6 is the graph of FIG. 2 overlaid with object resolution in an image for various zoom factors of a camera.

The graph of communication rate from FIG. 2 is repeated in FIG. 6 and is overlaid with information regarding the object resolution in an image to form graph 600. As in FIG. 2, the altitude in FIG. 6 represents the altitude of drone 120. Line 650 represents the amount (e.g., number) of pixels that represent the object (e.g., object resolution) in an image for a given altitude. With respect to the amount of pixel for an object, altitude in this graph may represent a distance between drone 120 and the object (suspect 130).

Graph 600 includes zoom factors 620, 622, 624, and 626. At zoom factor 620, as drone 120 rises from the valley floor, altitude 224, the image of the object (e.g., suspect 130) decreases in size in the image captured by camera 122. When drone 120 reaches altitude 630, the image of the object completely fills the sensor of camera 122, so the object resolution at altitude 630 for zoom factor 620 is 100%. While still at altitude 630, switching to zoom factor 622 reduces the object resolution to 20% of the total pixels of the image captured by camera 122. While still at altitude 630, switching to zoom factor 624 reduces the object resolution to 4% of the total pixels of the image. While drone 120 is still positioned at altitude 630, switching to zoom factor 626 reduces the object resolution to 2% of the total pixels of the captured image.

As drone 120 operates in a mode (e.g., stealth, tracking, observation), it attempts to position itself between altitude 220 and 222, so it can communicate at a rate that is equal to or greater than threshold 210. While in the stealth mode, drone 120 attempts to position itself between altitude 260 and 222 so that it can communicate at a rate that is equal to or greater than threshold 210. While positioned between these altitudes (e.g., 220-222, 260-222), drone 120 may adjust the zoom of camera 122 to attempt to meet the object resolution criteria (e.g., surveillance minimum, observation minimum). For example, at zoom factor 620, the resolution of the object in the image is between 75%, at altitude 220, 67%, at altitude 260, and 48%, at altitude 222. Using zoom factor 620, enables drone 120 to meet the requirement of communication at a rate equal to or greater than threshold 210, object resolution requirement for the observation mode and the tracking mode for the 24.2 mega pixel camera example discussed above, and the perceived sound criterion for the stealth mode.

However, at zoom factor 620 for a 24.2 mega pixel camera, the object resolution is always greater the surveillance resolution of about 1%. While using zoom factor 620, drone 120 would need to rise to about altitude 632 or higher to achieve an object resolution that is about the surveillance resolution for 24.2 mega pixel camera (e.g., 1%). At such a high altitude, drone 120 could not achieve the communication rate criterion. Further, at the lower altitudes having the object resolution greater than the surveillance resolution for the tracking and stealth modes is not a problem.

At zoom factor 622, while drone 120 is between altitude 220 and 222, drone 120 may communicate at a rate equal to or greater than threshold 210 and maintain an object resolution of between 14.5% and 9.6%. Between altitude 260 and 222, drone 120 may communicate at a rate equal to or greater than threshold 210 and maintain an object resolution of between 12.5% and 9.6%. Again, for the example 24.2 mega pixel camera, zoom factor 622 enables drone 120 to meet requirements for the tracking mode and stealth mode, with an object resolution that is much greater than the surveillance resolution.

At zoom factor 624, while drone 120 is between altitude 220 and 222, drone 120 may communicate at a rate equal to or greater than threshold 210 and maintain an object resolution of between 3.0% and 1.9%. Between altitude 260 and 222, drone 120 may communicate at a rate equal to or greater than threshold 210 and maintain an object resolution of between 2.6% and 1.9%. Again, for the example 24.2 mega pixel camera, zoom factor 624 enables drone 120 to meet requirements for the tracking mode and stealth mode, with an object resolution that is still much greater than the surveillance resolution of 1% for the 24.2 mega pixel camera.

At zoom factor 626, while drone 120 is between altitude 220 and 222, drone 120 may communicate at a rate equal to or greater than threshold 210 and maintain an object resolution of between 1.5% and 0.9%. Between altitude 260 and 222, drone 120 may communicate at a rate equal to or greater than threshold 210 and maintain an object resolution of between 1.3% and 0.9%. At an altitude that is less than altitude 222, the object resolution is about 1%, which is the surveillance resolution for the example 24.2 mega pixel camera. So, drone 120 may use zoom factor 626 in the tracking mode and the stealth mode as long as its altitude is less than altitude 222 and the object resolution is greater than 1%. At these altitudes, the communication rate is greater than threshold 210, so the communication rate threshold is met.

If drone 120 were in the stealth mode, camera 122 could be set to use zoom factor 626 and drone 120 could hoover just below altitude 222, which provides communication rate greater than threshold 210, an object resolution of about 1% for the example 24.2 mega pixel camera, and a sound intensity level as perceived by the target that is below the perceived sound criterion.

Drone 120 moves, in three dimensions and adjusts the zoom factor of camera 122 to achieve the communication rate, object resolution for the current mode of operation, and when in the stealth mode the perceived sound criterion. As discussed above, the video data capture requirement (e.g., resolution of the object in the camera image) may have priority over communication. However, it is also possible to prioritize maintaining the communication rate over video capture. In the event that communication above a threshold is prioritized, drone 120 could adjust the zoom of camera 122 to capture video of the object at the best object resolution possible at the altitudes required for communication above the threshold.

The zoom factor is another variable that may be adjusted for achieving the requirements of each mode (e.g., stealth, tracking, observing). For example, a number of pixels in which an object is represented in a captured image may be increased by increasing a zoom factor of a camera. In embodiments, the zoom factor may be mechanically and/or digitally adjusted. For example, a camera of a drone may include an optical zoom lens, enabling the zoom factor to be mechanically (e.g., optically) adjusted. Alternately or additionally, a processing circuit of the camera and/or drone may provide a digital zoom function, enabling the zoom factor to be adjusted electronically.

In embodiments, an altitude of a drone and a distance between the drone and an object may be separately adjusted. For example, the distance may be maintained by changing a latitude and/or longitude of the drone while the altitude or elevation of the drone changes. As another example, the altitude may be maintained while changing the distance by changing both a latitude and a longitude of the drone relative to the object. Accordingly, one of the altitude and the distance may be changed independent of the other in accordance with a comparison executed by the drone.

In other embodiments, an adjustment to the distance or the altitude may include a related change in the other of the altitude or distance. The adjustment to the distance or altitude may include a corresponding, adjustment to the altitude or relative distance of the drone. Accordingly, each of the altitude and the distance may be changed concurrently in accordance with a comparison executed by the drone.

In embodiments, regulating a drone may include regulating the drone in accordance with a mode of operation (e.g., operational mode) of the drone, wherein the mode includes one or more criteria or requirements. Regulating the drone may include adjusting the drone so that each criterion of the one or more criteria are met. Meeting a criterion may include comparing a value associated with the drone and the criterion. When each of the criterion are met in accordance with each comparison, the drone may be determined to be operating in accordance with the mode. If at least one of the criteria are not met in accordance with the one or more comparisons, operation of the drone may be regulated (e.g., adjusted) to meet or achieve (e.g., fulfill) the one or more criteria of the mode.

In embodiments, each comparison associated with a criterion and a value associated with the drone may result in a comparison value. The comparison value may be generated from the comparison. The comparison value may indicate the relationship between the criterion and the value associated with the drone. Collectively, one or more comparison values indicate whether the drone is currently positioned and/or otherwise operated in accordance with an operation mode of the drone. Each comparison value may be used to adjust a variable of the drone, including one or more of an altitude of the drone, a camera of the drone, and/or a relative position between the drone and an object. In embodiments, the comparison value may include one or more of a Boolean value and a ratio.

In embodiments, a balance between communication, object resolution, and sound intensity level may be expressed as Boolean equations for each mode of operation. If the result of the Boolean equation is True, the drone meets the criteria for the mode. The Boolean equations for the various modes are provided below. The symbol ">~" means: approximately equal to, but not less than. The symbol "~" means approximately equal to.

Observation mode=(communication rate≥communication rate threshold)&(object resolution≥observation resolution).　　　　　　Equation 1:

Tracking mode=(communication rate≥communication rate threshold)& (object resolution≥surveillance resolution).　　　　　　Equation 2:

Stealth mode=(communication rate≥communication
rate threshold)& (object resolution≥surveillance
resolution)&(sound intensity level of drone-
≤sound intensity level threshold). Equation 3:

In embodiments, a sound intensity level of a drone may include a sound intensity level of the drone as perceived by a target.

As discussed above, for a situation in which there are no sound sensors proximate to a target, the sound intensity level may be estimated by the distance the drone is positioned from the target. When distance is used to estimate the sound intensity level, equation 3 may become equation 3A shown below.

Stealth mode=(communication rate≥communication
rate threshold)& (object resolution≥surveillance
resolution)&(distance to target≥distance for
(sound intensity level of drone≤sound intensity
level threshold)). Equation 3A:

In embodiments, a sound intensity level of a drone may be a sound intensity level of the drone as perceived by a target.

When observation mode, tracking mode, and stealth mode for equations 1-3 and 3A respectively are True, the communication, object resolution, and sound intensity level requirements for that particular mode are met; otherwise, one or more of the requirements have not been met.

Numerical values for each component of equations 1-3 and 3A may be assessed as ratios to determine whether a drone may change his position to improve value of one component at the expense the value of another component. For example, the communication rate component of equations 1-3 and 3A may be numerically analyzed as a ratio as shown below in equation 4.

communication ratio=(communication rate/communication rate threshold). Equation 4:

If the communication ratio is greater than one, the communication rate may decrease and still meet the communication rate threshold requirement. For example, if the communication rate threshold is 5 Mbps and the present communication rate is 5.3 Mbps, then the communication ratio is 1.06, which means that the communication rate may decrease while still meeting the communication rate threshold. In another example, if communication rate threshold is 5 Mbps and the present communication rate is 4.8 Mbps, the communication ratio is less than one. The drone needs to change his position to increase the communication rate to meet communication rate threshold.

In the examples given above where the communication rate is related to the altitude (e.g., FIGS. 3 and 6), a communication ratio of greater than one means that drone 120 could move to a lower altitude while still meeting the communication rate requirement. A communication ratio of less than one means that drone 120 must move to a higher altitude to meet communication requirement.

The object resolution component of equations 1 and 2-3 and 3A may be numerically analyzed as ratios as shown below in equation 5 and 6 respectively.

object resolution ratio for observation mode=object
resolution/observation resolution. Equation 5:

object resolution ratio for tracking mode=object
resolution/surveillance resolution. Equation 6:

For example, with respect to equation 5, if the observation resolution is 60% and the present object resolution is 35%, the object resolution ratio=0.583, which means that the drone must either change the zoom factor or move closer to the object to increase the object resolution to meet the threshold. If the object resolution is 70% in the observation resolution is 60%, then the object resolution ratio=1.167, which means that for the present zoom factor, the drone may move farther away from the object and still meet the object resolution requirement. When the object resolution ratio is greater than or equal to one, the object resolution requirement for the observation mode has been met.

In an example for equation 6, if the surveillance resolution is 3% and the present object resolution is 10%, the object resolution ratio=3.33, which means that the drone may move farther away from the object and still meet the object resolution requirement. If the object resolution is 1% in the surveillance resolution is 3%, then the object resolution ratio=0.333, which means that the drone must either change zoom factor or move closer to the object to increase the object resolution to meet the threshold.

With respect to equations 3, the sound intensity level ("SIL") component may be numerically analyzed as a ratio as shown below in equation 7.

SIL ratio=sound intensity level threshold/sound
intensity level as perceived by target. Equation 7:

For example, with respect to equation 7, if the SIL threshold is 20 dB and the present SIL as perceived by the target is 14 dB, the SIL ratio=1.429, which means that the drone may move closer to the target and still meet the SIL threshold requirement (e.g., perceived sound criterion). If the present SIL as perceived by the target is 30 dB and the SIL threshold is 20 dB, the SIL ratio=0.667, which means that the drone must move away from the target in order to meet the SIL threshold requirement.

A SIL ratio for equation 3A as shown below as equation 8.

SIL ratio=distance to target/(distance for (sound
intensity level as perceived by target=sound
intensity level threshold)). Equation 8:

For example, with respect to equation 8, assume that the SIL threshold is 20 dB and the distance the drone needs to be away from the target for the target to perceive a SIL of 20 dB is 300 feet. If the drone is presently 200 feet from the target, the SIL ratio=0.667, which means that the drone must move away from the target in order to meet the SIL threshold requirement. If the drone is presently 400 feet away from the target, the SIL ratio=1.333, which means that the drone may move closer to the target and still meet the SIL threshold requirement.

Numerical analysis of the components of the above equations may be used by a drone to determine how it may move to position itself to meet the requirements for a specific mode. When the value of a ratio from the above equations is equal to one, that requirement for that component has been met. When the value of a ratio from the above equations is less than one, that requirement for the component has not been met and the drone must move to increase the value of the ratio so that it is at least one. When the value of a ratio from the above equations is greater than one, the requirement for that component has been met and the drone may remain where it is if all other ratios have been met or it may move to decrease the ratio if needed.

As discussed above, the value of a component (e.g., greater than one, less than one) provides information to the drone as to whether it may increase or decrease in altitude or move toward/away from an object to attempt to meet the requirements of a mode.

For example, assume that the drone is operating in the tracking mode and that the communication ratio (e.g., equation 4) is 1.5 and the object resolution ratio for tracking (equation 6) is 1.2. Because the communication ratio is greater than one, the drone knows that it is presently meeting the required communication rate, but that it could move to a lower or a higher altitude if needed. Because the object resolution ratio for tracking is greater than one, the drone knows that it is presently meeting the required object resolution for tracking, but that it could move to a higher altitude or further away from the target if needed. For this example, the drone does not need to move to a new location or altitude to meet the requirements of the tracking mode, but the values of the components provide the drone information as to how it could move if needed.

In another example, assume that the drone is operating in the observation mode and that the communication ratio (e.g., equation 4) is 0.9 and the object resolution ratio for observation (equation 5) is 1.2. Because the object resolution ratio for observing is greater than one, the drone knows that it is presently meeting the required object resolution for observation, but that it could move to a higher altitude or further away from the target if needed. Because the communication ratio is less than one, the drone knows that it needs to move to a different position or altitude to meet the required communication rate. In this example, assume that the drone is positioned at altitude 220 with respect to FIG. 2 or 6. The drone knows that it must move to a higher altitude to be able to meet the communication rate requirement; however, the drone also knows that it can move to a higher altitude and likely still keep the object resolution ratio greater than or equal to one. In response, the drone moves to a higher altitude while monitoring the values of the object resolution ratio and the communication ratio. When the values of both components our equal to or greater than one, the drone knows that it is meeting the requirements for the observation mode.

In another example, assume that the drone is working in the stealth mode. Assume that the SIL threshold is 20 dB and that the drone must be at least 350 feet away from the target for the target to perceive the noise from the drone at a sound intensity level of 20 dB. Assume, that the drone is only 300 feet away from the target, so the SIL ratio is 0.86. Further assume that the communication ratio is 1.1 and that the object resolution ratio for tracking is 0.9 at a zoom factor 626. Because the SIL ratio is less than one, the drone knows that it must move to a higher altitude or farther away from the target to meet the SIL threshold requirement. The drone knows that since the communication ratio is greater than one, it could move to a higher altitude if needed to meet SIL ratio requirement. However, the drone could just as easily stay the same altitude and move an additional 50 feet away from the target horizontally to meet the SIL threshold requirement. Moving horizontally, may maintain the current communication rate. However, the drone is not presently meeting the object resolution requirement for tracking. In this case, the drone could meet the object resolution requirement by moving closer to the target; however, the drone cannot move closer to the target and still meet the SIL threshold requirement. At this juncture, the drone knows to operate in the stealth mode it must move farther away from the target, but that the zoom factor may be changed to meet the object resolution requirement. In this case, the drone moves further away from the target to meet the SIL as perceived by the target requirement while switching from zoom factor 626 to zoom factor 624 to increase the object resolution while maintaining the rate of communication greater than the threshold, so that all requirements for the stealth mode are met.

The above examples show how a drone may use the values of equations 4 through 8 to determine how the drone may change its location, if needed, to meet the requirements for a mode.

In embodiments according to various aspects of the present disclosure, a result of a comparison between a value associated with a drone and a criterion (e.g., a comparison value) may be further compared against a predetermined value. The predetermined value may be determined in accordance with a mode of operation of the drone. The predetermined value may include one or more of a logical value and a numerical value. For example, the predetermined value may include a logical value of "true". The predetermined value may include a numerical value of one as discussed in the above examples. In other embodiments, alternate or additional predetermined values may be employed, including those that are less than or greater than one. The predetermined value may be included in information stored in memory of the drone prior to an operation of the drone and/or prior to an operation of the drone in a mode of operation with which the result of the comparison and predetermined value may be used.

Figure 7:
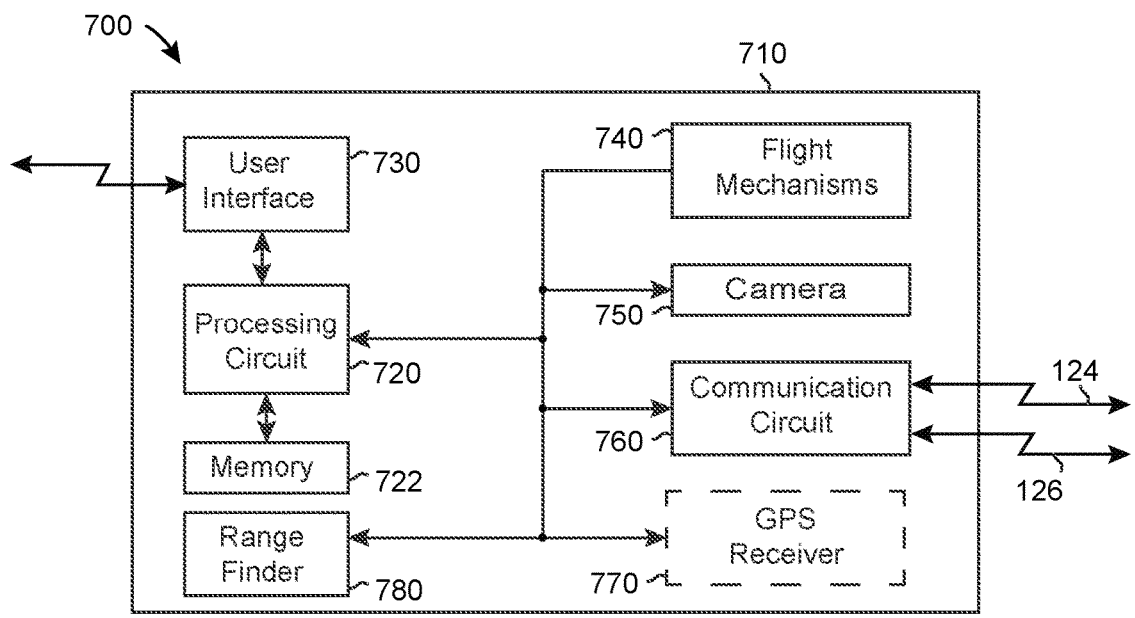
FIG. 7 is an implementation of a drone.

An implementation of a drone, drone 700, is shown in FIG. 7. Drone 700 includes housing 710, processing circuit 720, memory 722, user interface 730, flight mechanics 740, camera 750, and communication circuit 760. Drone 700 may optionally include global positioning ("GPS") receiver 770 and/or range finder 780. Drone 700, camera 750, GPS receiver 770 and range finder 780 perform the functions of a drone, a camera, a GPS receiver and a rangefinder respectively as discussed above.

A housing provides structure for holding the components of a drone in position so they can cooperate to perform the functions of a drone. A housing may be referred to as a frame (e.g., airframe). A housing may be formed of a rigid, light-weight material. A frame is formed of a material with sufficient strength to withstand the forces (e.g., torque, acceleration, movement, vibration) associated with a drone and flight. The components of a drone may be mounted to the housing.

A user interface includes any type of interface for a user to provide information to a drone and/or receive information from a drone. A user interface may include controls (e.g., buttons, switches, touch screen) for manual operation by a user to provide information to a drone. A user interface may include an on-off switch for applying power to or removing power from a drone. A user interface may include switches for selection of a mode of operation (e.g., track, observe, stealth) by a user. A user interface may include a touchscreen for providing (e.g., entering) information (e.g., user ID, altitude at launch) into a drone. A user interface may include a display (e.g., LCD, touch screen) for providing information to a user.

For example, user interface 730 includes controls for manual operation by a user to provide information to drone 700. Processing circuit 720 receives the information entered by the user via user interface 730. Processing circuit 720 may perform an operation responsive to the information from user interface 730. Processing circuit 720 may store the information received from user interface 730 in memory 722. Processing circuit 720 may provide information to user interface 730 for display on a display of user interface 730. Processing circuit 720 may receive information from memory 722, communication circuit 760, camera 750, and/or GPS receiver 770 for sending to user interface 730 for presentation on a display of user interface 730. A processing circuit may perform a computation on data and provide the data to user interface 730 for presentation on the display of user interface 730.

A processing circuit may control, in whole or in part, the operations of a drone. A processing circuit may control the flight of a drone. A processing circuit may autonomously or partially autonomously control the flight of a drone. A processing circuit may determine the value of equations 1-3, 3A and 4-8. A processing circuit may use the values from equations 1-3, 3A and 4-8 to determine whether and/or how the drone may be repositioned. A processing circuit may use the values from equations 4-8 to control the flight of a drone. A processing circuit may control video data capture by a camera of the drone. A processing circuit may receive position data (e.g., three dimensional; x, y, z; latitude, longitude, altitude) from a GPS receiver. A processing circuit may use position data from a GPS receiver to control flight of the drone.

A processing circuit may control communication (e.g., transmission, reception) of a communication circuit. A processing circuit may alone or in cooperation with a communication circuit measure a communication rate of the communication circuit. A processing circuit may determine whether a communication rate of a communication circuit is at, below or above a threshold. A processing circuit may cooperate with a camera and a communication circuit to transmit video data. A processing may receive instructions from a communication circuit for controlling the flight of the drone. A processing circuit may receive information from a communication circuit for selecting and/or detecting an object for tracking and/or observation.

A communication circuit may transmit and/or receive data (e.g., information). A communication circuit may transmit and/or receive (e.g., communicate) data via a wireless link. A communication circuit may perform short-range wireless communication and/or long-range wireless communication. Short-range wireless communication may have a transmission range of approximately 20 cm-100 meters. Communication protocols for short-range wireless communication may include Bluetooth, Zigbee, NFC, IrDA. Long-range wireless communication may have a transmission ranges up to 15 kilometers. Communication protocols for long-range wireless communication may include WiFi, GSM, GPRS, 3G, LTE, 5G. A communication circuit may communicate with a base station using long-range wireless communication.

A communication circuit may wirelessly communicate with a remote control operated by a user to provide operating, including flight, instructions to the drone. Communication protocols for wireless communication with a remote control may include PWM, PCM, CPPM, DSM, FrSky, FASST, FlySky, and/or a proprietary protocol.

A communication circuit may establish and/or maintain communication with a communication device of a user, a base station, and/or a remote control at a location where the drone is operating. A communication circuit may communicate by transmitting data and/or receiving data. A communication circuit may establish a wireless communication link for wireless communication using a wireless communication protocol. A communication circuit may establish and communicate via one or more wireless communication links (e.g., 124, 126). A communication circuit may communicate via two or more communication links at the same time. Each wireless communication link may operate in accordance with the same or a different wireless communication protocol. A communication circuit may measure its rate of communication. A communication circuit may report its rate of communication. In embodiments, a communication circuit may transmit an image to a remote server and receive an object resolution of an object in the image from the server in response to transmitting the image.

A processing circuit may detect an object in an image. An image may be provided by a camera. The camera may be mounted on the drone. A processing circuit may determine the number of pixels (e.g., resolution) used to represent an object in an image from a camera (e.g. object resolution). For example, a processing circuit may include an object detection engine configured to detect the object and generate the object resolution of the object. A processing circuit may determine whether the number of pixels used to represent an object in an image is greater than, equal to, or less than a threshold (surveillance resolution, observation resolution). A processing circuit may use information regarding an object in an image to track the object. A processing circuit may use information regarding an object in an image to observe the object. A processing circuit may control movement of a drone in accordance with whether the resolution of an object in an image is at, below, or above a threshold. A processing circuit may control movements of a drone in accordance with the resolution of an object in an image. A processing circuit may control movements of a drone in accordance with the resolution of an object in an image and a rate of communicate. A processing circuit may control movements of a drone in accordance with the resolution of an object in an image and a rate of communicate in accordance with a mode of operation (e.g., tracking, observation, stealth) of the drone.

In an implementation, a processing circuit may include any circuitry and/or electrical/electronic subsystem for performing a function. A processing circuit may execute one or more stored programs. A processing circuit may include a digital signal processor, a microcontroller, a microprocessor (e.g., processor), an application specific integrated circuit, a programmable logic device, logic circuitry, state machines, MEMS devices, signal conditioning circuitry, memory, data busses, and/or address busses. A processing circuit may include conventional passive electronic devices (e.g., resistors, capacitors, inductors) and/or active electronic devices (e.g., op amps, comparators, analog-to-digital converters, digital-to-analog converters, programmable logic). A processing circuit may include output ports, input ports, timers, embedded memory, and/or arithmetic units.

A processing circuit may provide and/or receive electrical signals whether digital and/or analog in form. A processing circuit may provide and/or receive digital data (e.g., information) via a bus using any protocol. A processing circuit may receive data, manipulate data (e.g., perform computations, analyze), and provide the manipulated data. A processing circuit may store data and retrieve stored data. Data received, stored, and/or manipulated by a processing circuit may be used to perform a function.

A processing circuit may control the operation and/or function of other circuits and/or components of a system. A processing circuit may receive data from other circuits and/or components of a system. A processing circuit may receive status information regarding the operation of other components of a system. A processing circuit may provide commands (e.g., instructions, signals) to one or more other components responsive to data, a computation, and/or status information. A command may instruct a component to start operation, continue operation, alter operation, suspend operation, and/or cease operation. Commands and/or status may be communicated between a processing circuit and other circuits and/or components via any type of bus.

A camera includes one or more sensors for detecting physical properties. Physical properties may include light. A camera may further detect sound. A sensor of the camera detects light. A sensor may include a semiconductor device such as charged coupled device (e.g., CCD). An area of the sensor (e.g., array) may be described as having rows (e.g., height) and columns (e.g., width) of pixels. Each pixel detects light. The pixels capture light at a moment in time to form an image. An image includes rows and columns of pixels. The pixels may represent objects, or a portion thereof, that were in the field of view of the camera when the image was captured. A sensor may provide pixel data (e.g., image data) as digital data. Digital image data may be presented, for example on a display. An image may be comprehensible to a human. The digital data of an image may be processed (e.g., calculated, manipulated, analyzed) by a processing circuit. A processing circuit may detect an object in the image captured by a sensor of a camera.

A camera may capture a single image (e.g., still) or a sequence of images (e.g., video data) at a rate (e.g., 30 frame-per-second). A camera that captures a sequence of images at a rate may be referred to herein as a video camera. One image of a sequence of images captured by a video camera may be described as a frame or an image. A camera may capture images in color and/or in black and white. A camera may capture images in the visible light spectrum. A camera may capture images outside (e.g., infrared, ultraviolet, x-ray) the visible light spectrum.

A camera may include optics (e.g., lenses, filters). A camera may include one or more lenses. A lens of a camera may have a variable focal length. A focal length of the lens may be changed to captures images of objects at different sizes. A focal length of the lens may be changed to zoom to capture images of a portion of an area. A focal length of a lens may be changed to zoom out to capture images of a larger portion of an area. Different focal lengths of a camera may be referred to herein as zoom factors. A lens of a camera may have variable apertures. A processing circuit may control, in whole or part, the operation of the optics of a camera.

A camera may be mounted on a gimble that is mounted to a drone. A camera may be positioned by a gimble to capture image data in a particular direction. A gimble may include a gyroscope for stabilizing the camera against movement and/or vibration. A processing circuit may control, in whole or part, the operation of the gimble to position the camera.

A camera may perform image stabilization. A camera and/or lens may include an optical image stabilizer. A camera may perform real-time digital images stabilization.

A memory may store and/or retrieve data. A memory may store and/or retrieve one or more stored programs. A memory may store and/or retrieve digital data. A memory may store and/or retrieve image data captured by a camera. A memory may store and/or retrieve data that results from analysis of image data. A processing circuit may store data in a memory. A processing circuit may retrieve data from a memory. A memory may include non-volatile memory. Instructions for execution by a processing circuit (e.g., a stored program) may be stored in non-volatile memory. An implementation of a memory may include any semiconductor, magnetic, optical technology, or combination thereof. A memory may be referred to as a storage medium or a medium for storage. A memory may include different memories in which some memories store data and other memories store programs. A memory may be removable, replaceable, and/or reprogrammable.

Flight mechanisms include the structures and electronics required for a drone to fly and move. Flight mechanisms may include one or more frames (e.g., housing), propellers (e.g., rotors), pusher propellers, and motors (e.g., brushless electric). Flight mechanisms may also include one or more of a landing gear, a power supply, and/or an electronic speed controller. Flight mechanisms may include a processing circuit that controls and coordinates the operation of the flight mechanisms (e.g., flight controller) to cause the drone to fly, land, turn, hoover, or perform any other maneuver or operation related to flight. A processing circuit that controls other aspects (e.g., camera, communication) of the operation of the drone may perform the operations of a flight controller in whole or in part. In embodiments, flight mechanisms of a drone (e.g., drone 700) may include at least one propeller and at least one motor. The flight mechanisms may be coupled to a processing circuit to receive one or more control signals from the processing circuit. Responsive to the one or more control signals, the flight mechanisms may change a position (e.g., altitude, latitude, longitude, relative distance to object, etc.) of the drone in air (e.g., fly). The flight mechanisms may be configured to fly or move the drone in air in response to the one or more control signals received from the processing circuit. The processing circuit may control the flight mechanisms to automatically change a position of the drone.

A global positioning ("GPS") receiver receives signals from four or more satellites. A GPS receiver uses the signals from the satellites to determine the geographic position (e.g., latitude, longitude; easting, northing) and altitude of the receivers. A GPS receiver may report the three-dimensional position (e.g., geographic position plus altitude). A processing circuit may use position data from a GPS receiver to navigate (e.g., position, maneuver) a drone. A processing circuit may use position data from a GPS receiver to determine a distance between the drone and a target as discussed above. A processing circuit may record position data from a GPS receiver in a memory. A processing circuit may communicate position data via a communication circuit.

A range finder determines a distance between the drone and another object such as a target. Range finding, as discussed above, may be accomplished using any suitable technique. In an implementation, a laser may be used to determine the distance between the drone and a target. In another implementation, GPS altitude information may be compared to altitude information taken from topographical data to find a distance between the drone and a target. In another implementation, a range finder receives altitude information regarding a target which is compared to altitude information of the drone as provided by a GPS receiver.

Housing 710, processing circuit 720, memory 722, communication circuit 760, camera 750, flight mechanisms 740, GSP receiver 770, and rangefinder 780 include the structure and perform the functions of a housing, a processing circuit, a memory, a communication circuit, a camera, flight mechanisms, a GSP receiver, laser rangefinder respectively as discussed above.

Processing circuit 720 may execute one or more programs stored in memory 722 (e.g., stored program) to perform any of the methods disclosed herein. A stored program may be referred to as code or computer executable instructions that are executed by processing circuit 720 (e.g., processor, microprocessor) to perform a method. Processing circuit 720 may execute one or more stored programs in series or in parallel to perform one or more methods in serial or in parallel. Execution of a stored program by processing circuit 720 to perform a method may be referred to as a computer implemented method. Memory 722 may be referred to as a computer-readable medium or media, as discussed above, or non-transitory computer-readable medium or media. Execution of the code on a computer-readable medium by processing circuit 720 causes processing circuit 722 perform the method programmed in the code. Processing circuit 720, operating in accordance with a stored program, may control and/or cooperate with any circuit and/or electrical/electronic subsystem of drone 700 to perform any of the methods disclosed herein.

For example, processing circuit 720 may execute a stored program to determine a distance between drone 700 and a target. As discussed above, one method for determining the distance between drone 700 at a target is to use a laser rangefinder. Using this method, processing circuit 720 executes a stored program to instruct a laser in rangefinder 780 to oriented itself toward a target. Rangefinder 780 measures the distance between the drone and the target. Rangefinder 780 reports the distance to processing circuit 720. Processing circuit 720 may use the distance to estimate sound attenuation between the drone and the target. Processing circuit 720 may use the distance to determine a value for equation nos. 3A and 8.

As discussed in another method, a stored program when executed by processing circuit 720 may cause processing circuit 720 to perform the following steps. Processing circuit 720 instructs GPS receiver 770 to provide geographic location and altitude information regarding drone 700. Processing circuit 720 accesses topographical data stored in memory 722. Processing circuit 720 uses a geographic location of drone 700 to determine its position in the topographical data. After processing circuit 720 has determined its position in the term graphical data, processing circuit 720 determines the distance drone 700 is positioned above the geographic location. The distance between drone 700 and the geographic position in the topographical data may be used by processing circuit 720 as the distance between drone 700 and the target.

The stored program for determining distance may be executed by processing circuit 720 at any time and/or in parallel with any other stored program.

Processing circuit 720 may also execute one or more stored programs to perform methods 1-4, discussed above, for determining the sound intensity level as perceived by a target. For example, with respect to method one, processing circuit 720 may execute a program to determine the distance between drone 700 and a target. An example of such program as discussed above. Processing circuit 720 may execute a stored program to determine the sound intensity level of the sound generated by drone 700. Processing circuit 720 may execute a stored program to determine an estimate of the attenuation of the sound from drone 700 along the distance toward the target. Processing circuit 720 may execute a stored program to subtract the estimated attenuation from the sound intensity level of the drone to determine the sound intensity level of the sound from the drone as perceived by the target.

Processing circuit 720 may execute one or more stored programs to perform methods 2-3 discussed above.

Processing circuit 720 may execute a stored program to calculate a communication ratio as shown in equation no. 4. Processing circuit 720, under control of the stored program, may instruct communication circuit 760 to determine the present communication rate of communication circuit 760. Processing circuit 720 may execute the stored program to retrieve from memory 722 the communication rate threshold or to receive the communication rate threshold via user interface 730 and/or communication circuit 760. Processing circuit 720 may execute a stored program to determine communication ratio.

Processing circuit 720 may execute a stored program to calculate the object resolution ratio for the observation mode as identified in equation no. 5 and/or the object resolution ratio for tracking as identified in equation no. 6. The stored program may instruct processing circuit 720 to determine the resolution of the object in an image captured by camera 750. To determine the resolution of an object, processing circuit 720 may access stored information from memory 722 to determine the resolution of an object in the various modes. Processing circuit 720 may receive image information from camera 750 and perform image analysis to detect the object and quantify the number of pixels (e.g., object resolution) used to represent the object in the image. Processing circuit 720 may divide the object resolution by the observation resolution or the surveillance resolution to determine the value of equation nos. 5 and 6 respectively.

Processing circuit 720 may execute a stored program to determine the Boolean values of equation nos. 1-3 and 3A. The stored program may instruct processing circuit 722 get the present communication rate from communication circuit 760, access the communication rate threshold from memory 722, determine the object resolution from an image captured by camera 750, retrieve a value for surveillance resolution or observation resolution from memory 722, determine the sound intensity level as perceived by the target, access the sound intensity level threshold from memory 722, determine the distance between drone 700 and a target, and calculate a distance between drone 700 and a target so that the sound intensity level of the sound of drone 700 at the target is less than the sound intensity level threshold. Processing circuit 720 may be instructed by the stored program to use the retrieved/calculated/estimated/measured values in Boolean equation nos. 1-3 and 3A to determine whether the requirements for the observation mode, tracking mode, and/or stealth mode are met.

A stored program may instruct processing circuit 720 two autonomously or semi-autonomously maneuver drone 700. A stored program may use any value calculated by equations 1-3, 3A, and 4-8 to control and/or inform the movement of drone 700. Execution of code by processing circuit 720 may periodically and/or nearly continuously update calculated and/or estimated values, change the location of drone 700, switch from one mode of operation to another mode of operation, and or perform any method and/or function disclosed herein.

Figure 9:
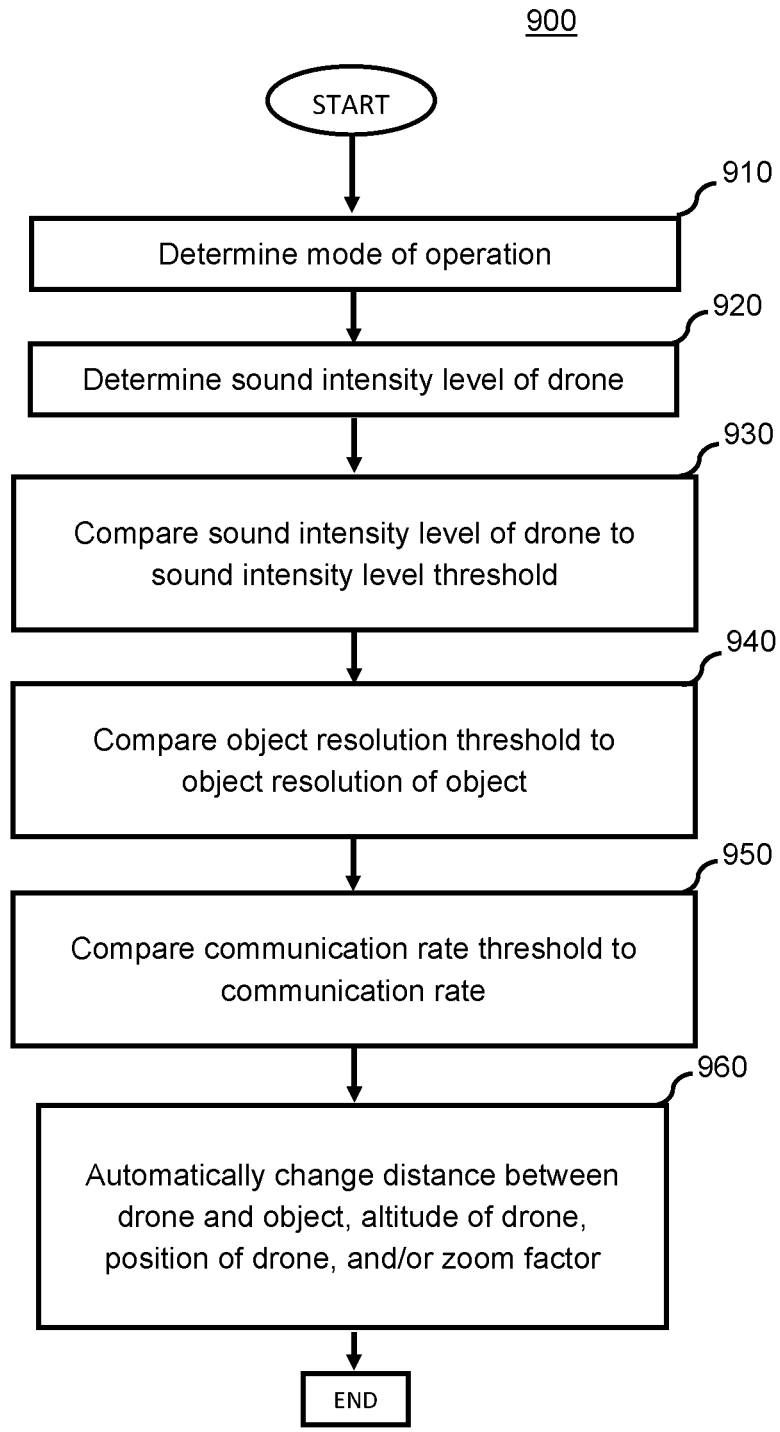
FIG. 9 is a flow diagram of a method of regulating a drone in embodiments according to various aspects of the present disclosure.

In embodiments according to various aspects of the present disclosure, a method for regulating a drone may be provided. Method 900 for regulating a drone may include one or more operations as illustrated in FIG. 9. In embodiments, a non-transitory computer-readable medium may store instructions that, when executed by a processing circuit of a drone, may cause the drone to perform one or more operations of method 900.

After starting, a mode of operation may be determined 910. In embodiments, the mode of operation may include one of a target mode, an observation mode, and a stealth mode. Determining the mode of operation may include receiving a command. The mode of operation may be selected in accordance with the command. A drone may determine 910 a mode of operation in accordance with a signal received via a communication circuit from a remote device. Determining 910 the mode of operation may include receiving the signal from a user interface device (e.g., handheld controller) associated with the drone.

In embodiments, determining 910 a mode of operation may include determining one or more criteria. The one or more criteria may be predetermined for the mode of operation. Determining 910 the mode of operation may include selecting the one or more criteria in accordance with the mode of operation. Determining 910 the mode of operation may include using the one or more criteria to regulate operation of the drone. Criteria associated with a mode of operation may be loaded from the memory and used by a processing circuit of the drone.

In embodiments, determining 910 a mode of operation may include selecting an object. Selecting the object may include receiving a command. The object may be selected in accordance with the command. A drone may select the object in accordance with a signal received via a communication circuit from a remote device. Selecting the object may include receiving the signal from a user interface device (e.g., handheld controller) associated with the drone. An image captured by a camera of the drone may be provided to user interface device and, in response to the provided image, a command or other signal selecting the object may be received by the drone. The command or signal may uniquely indicate the object relative to one or more other objects in an environment represented in the image. In embodiments, a selected object may include a target, used as a reference object for subsequent regulation of the drone.

In embodiments, a sound intensity level of the drone may be determined 920. The sound intensity level of the drone may include one or more of an estimated sound intensity level, a measured sound intensity level, and a calculated sound intensity level. Determining 920 the sound intensity level of the drone may include one or more of estimating the sound intensity level of the drone, measuring the sound intensity level of the drone, and/or calculating the sound intensity level of the drone. The sound intensity level of the drone may include a sound intensity level at an object. The sound intensity level of the drone may include a sound intensity level as perceived by an object. The sound intensity level of the drone may include a sound intensity level proximate to and/or representative of an environment in which an object is located. Determining 920 the sound intensity level of the drone may include receiving a measurement, such as a measured sound intensity level of an environment proximate to an object, a distance between the drone and an object, and/or the speed of rotation of one or more flight mechanisms of the drone.

In embodiments, a sound intensity level of the drone may be determined in accordance with a measured sound intensity level measured by a sensor associated with the drone. The sensor may include a microphone integrated with the drone. The sensor may include a microphone integrated with a device at a remote location or position, separate from a position or location of the drone. The sensor may include an environmental sensor positioned in a same environment in which an object is positioned. The sensor may include a remote sensor in wireless communication with the drone. The drone may receive the measured sound intensity level via a wireless communication link established between the drone and the sensor. In embodiments, the measured sound intensity level may be received via a wired communication link from the sensor. By receiving the measured sound intensity level, an accuracy of the sound intensity level of the drone may be improved relative to other methods of estimating the sound intensity level of the drone, such as estimating the sound intensity level based on a distance between the drone and an object. In embodiments, other approaches may be employed to determine the sound intensity level of the drone, including those that include a combination of one or more of the measured sound intensity level of the drone, an estimated sound intensity level of the drone, and/or other sound intensity level(s) of the drone.

In embodiments, other values for a drone may be determined at step 920 in addition to or as an alternative to a sound intensity level of the drone. For example, an object resolution of an object in an image captured by the camera of the drone may be determined. The object resolution of the object may include a number or percentage of pixels in which the object is represented in the image as further discussed elsewhere herein. In another example, a communication rate of the drone may be determined. The communication rate may include a communication rate between the drone and the base station.

In embodiments, determining 920 a sound intensity level of the drone may be optional and/or not performed in accordance with a determined mode of operation. For example, a sound criterion may not be defined for a first mode of operation, such that a sound intensity level of the drone need not be determined. However, after the mode of operations is determined, one or more other values associated with the drone (e.g., object resolution of object, communication rate, etc.) may be determined in accordance with the mode of operation.

After determining 920 a sound intensity level of the drone, the sound intensity level of the drone may be compared 930 to a sound intensity level threshold. The sound intensity level threshold may be determined in accordance with a mode of operation of the drone. For example, the mode of operation may be associated with a sound criterion, wherein the sound criterion includes the sound intensity level threshold. Comparing 930 the sound intensity level threshold to the sound intensity level of the drone may include setting or determining at least one of the sound intensity level threshold and the sound intensity level of the drone in accordance with a received or measured sound intensity level. In embodiments, comparing 930 the sound intensity level threshold to the sound intensity level of the drone may include setting or determining at least one of the sound intensity level threshold and the sound intensity level of the drone in accordance with an estimated sound intensity level. Comparing 930 the sound intensity level threshold to the sound intensity level of the drone may include determining whether the sound intensity level of the drone is less than the sound intensity level threshold. Comparing 930 the sound intensity level threshold to the sound intensity level of the drone may include determining whether the sound intensity level threshold is equal or greater than the sound intensity level of the drone.

In embodiments, comparing 930 the sound intensity level threshold to the sound intensity level of the drone includes calculating a sound intensity level ratio. The sound intensity level ratio may comprise dividing a sound intensity level threshold by the sound intensity level of the drone. The comparison may further include comparing the sound intensity level ratio to a predetermined value. The comparison may include determining whether the sound intensity level ratio meets or exceeds the predetermined value.

Method 900 may further include comparing 940 an object resolution threshold to an object resolution of an object in an image captured by a camera of the drone. The object resolution threshold may be determined in accordance with a mode of operation of the drone. For example, a mode of operation of the drone may include an object resolution criterion, wherein the object resolution criterion includes the object resolution threshold. The object resolution of the object may be determined by the drone in accordance with the image captured by the camera of the drone and information indicative of the object. The information indicative of the object may include an input associated with the object. The information indicative of the object may include a selection of the object. Comparing 940 may include determining whether the object resolution equals, meets, or exceeds the object resolution threshold.

In embodiments, comparing 940 the object resolution threshold to the object resolution of the object includes calculating an object resolution ratio. The object resolution ratio may include dividing the object resolution of the object in the image from the camera of the drone by an object resolution criterion selected in accordance with a mode of operation of the drone. Comparing 940 may include comparing the object resolution ratio to a predetermined value. The comparison may include determining whether the object resolution ratio, equals, meets, or exceeds the predetermined value.

Method 900 may further include comparing 950 a communication rate threshold to the communication rate. The communication rate threshold may be determined in accordance with a mode of operation of the drone. For example, the mode of operation of the drone may be associated with a communication rate criterion, wherein the communication rate criterion includes the communication rate threshold. The communication rate threshold may correspond to a minimum communication rate for transmitting live-stream video data from the drone to a remote server. The communication rate may be determined by a communication circuit of the drone. For example, the communication circuit of the drone may provide information indicative of a communication rate of the drone to a processing circuit of the drone to enable the comparison of the communication rate threshold to the communication rate to be performed. The communication rate may be a present communication rate of the drone, wherein the present communication rate indicates a rate of communication between the drone and at least one base station. Comparing 950 may include determining whether the communication rate equals, meets, or exceeds the communication rate threshold.

In embodiments, comparing 950 a communication rate threshold to a communication rate includes calculating a communication ratio. Calculating the communication ratio may include dividing a communication rate of the drone and by the communication rate threshold. Comparing 950 may further include comparing the communication ratio to a predetermined value. Comparing 950 may further include determining whether the communication ratio equals, meets, or exceeds the predetermined value.

After one or more comparisons have been made, operation of the drone may be automatically regulated 960 in accordance with the one or more comparisons. Automatically regulating 960 the drone may include automatically changing a distance between the drone and an object. For example, if a comparison indicates that a sound intensity level of the drone meets or exceeds a sound intensity level threshold, a distance between the drone and the object may be increased. The drone may automatically increase the distance via control of the one or more flight mechanisms of the drone. A processing circuit of the drone may control the flight mechanism to automatically change a position of the drone in air, thereby changing the distance between the drone and the object.

In embodiments, automatically regulating 960 operation of the drone may include changing an altitude of the drone. The changing of the altitude may include automatically increasing or automatically decreasing the altitude of the drone. For example, the altitude of the drone may be automatically increased responsive to a comparison indicating that a sound intensity level of the drone is not less than a sound intensity level threshold. In another example, the altitude of the drone may be automatically decreased in accordance with one or more comparisons indicating that an object resolution threshold is not met or exceeded. In another example, the altitude of the drone may be automatically increased in accordance with one or more comparisons indicating that a communication rate threshold is not met or exceeded. More generally, regulating 960 operation of the drone may include automatically changing a position of the drone in air in accordance with a mode of operation of the drone and one or more comparisons. Changing the position may include changing the altitude of the drone, alternately or in addition to changing a latitude and/or longitude of the drone.

In embodiments, automatically regulating 960 operation of the drone may include changing a zoom factor of a camera of the drone. The changing of the zoom factor may include automatically increasing or decreasing the zoom factor of the camera of the drone. For example, the zoom factor may be increased responsive to a comparison indicating that an object resolution threshold is not met or exceeded, thereby increasing an object resolution of an object in an image captured by a camera of the drone. In embodiments, the camera for which the zoom factor is changed is a same camera from which the object resolution of the object is determined.

In embodiments, automatically regulating 960 operation of a drone may include adjusting one or more properties of a drone and/or maintaining one or more other properties. For example, automatically regulating 960 may include changing an altitude of the drone and a distance between the drone and an object while maintaining a zoom factor of a camera of the drone. In another example, a zoom factor may be increased in response to one or more comparisons while an altitude and/or distance between the drone and an object are each maintained at a respective current value. As another example, each of a distance between a drone and object, zoom factor, and altitude of the drone may be concurrently changed in accordance with one or more comparisons. After automatically changing 960 operation of the drone, method 900 may end. While method 900 includes various steps 910-960, certain steps are optional, such that embodiments according to various aspects of the present disclosure may include subsets of these steps, including one or more subsets that exclude one or more operations illustrated in FIG. 9.

In embodiments, one or more operation of method 900 may be repeated. The operations may be repeated periodically over time to ensure a drone is regulated in accordance with a selected mode of operation. The operations may be repeated in accordance with one or more comparisons. For example, while comparing 930 a sound intensity level of the drone to the sound intensity level threshold indicates that the sound intensity level of the drone exceeds the sound intensity level threshold, operations 920-960 may be repeated. The one or more operations may be repeated until at least one of the one or more comparisons indicate one or more criterion of the determined mode of operation is fulfilled. In embodiments, the operations may be repeated until all criteria of a mode of operation are met.

In embodiments, at least one non-transitory computer-readable medium is provided. The medium may have stored thereon computer-readable instructions that when executed by a processor of a drone cause the drone to perform a method comprising calculating a communication ratio, calculating an object resolution ratio for a selected mode, and changing at least one of an altitude of the drone, a distance between the drone and an object, and a zoom factor of a camera until the communication ratio and the object resolution ratio for the selected mode are greater than or equal to one. The selected mode may be a tracking mode and an object resolution of the object in an image of the camera may be greater than or equal to a surveillance resolution. Calculating the object resolution ratio may comprise dividing an object resolution of the object in an image of the camera by a surveillance resolution. The selected mode may be an observation mode and an object resolution of the object in an image of the camera may be greater than or equal to an observation resolution. Calculating the object resolution ratio may comprise dividing an object resolution of the object in an image of the camera by an observation resolution. Calculating the communication ratio may comprise dividing a present communication rate of the drone by a communication rate threshold. The communication rate threshold may be sufficient to transmit live-stream video. The present communication rate may comprise a rate of communication between the drone and at least one base station.

In embodiments, at least one non-transitory computer-readable medium having stored thereon computer-readable instructions is provided. The instructions, when executed by a processor of a drone, may cause the drone to perform a method comprising calculating a communication ratio, calculating an object resolution ratio, calculating a sound intensity level ratio, and changing at least one of an altitude of the drone, a distance between the drone and an object, and a zoom factor of a camera until the communication ratio, the object resolution ratio, and the sound intensity level ratio are greater than or equal to one. Calculating the object resolution ratio may comprise dividing an object resolution of the object in an image of the camera by a surveillance resolution. Calculating the communication ratio may comprise dividing a present communication rate of the drone by a communication rate threshold. The communication rate threshold may be sufficient to transmit live-stream video. The present communication rate may comprise a rate of communication between the drone and at least one base station. Calculating the sound intensity level ratio may comprise dividing a sound intensity level threshold by a sound intensity level of the drone as perceived by the object. The sound intensity level threshold may be less than or equal to 30 dB. The method may further comprise receiving a sound intensity level of an environment proximate to the object, wherein the sound intensity level threshold may be less than or equal to the sound intensity level of the environment proximate to the object.

In embodiments, at least one non-transitory computer-readable medium is provided, the medium having stored thereon computer-readable instructions that when executed by a processor of a drone cause the drone to perform a method comprising flying between a minimum altitude and a maximum altitude to establish a rate of communication between the drone and at least one base station that is greater than a communication rate threshold, maintaining at least a threshold distance between the drone and an object to establish a sound intensity level of the drone as perceived by the object to be less than a sound intensity level threshold, and changing at least one of an altitude of the drone, a distance between the drone and the object, and a zoom factor of a camera to establish an object resolution that is greater than or equal to a surveillance resolution, while maintaining the altitude greater than the minimum altitude and less than the maximum altitude and the threshold distance between the drone and the object. The communication rate threshold may be sufficient to transmit live-stream video. The sound intensity level threshold may be less than or equal to 30 dB. The method may comprise receiving a sound intensity level of an environment proximate to the object, wherein the sound intensity level threshold is less than or equal to the sound intensity level of the environment proximate to the object.

In embodiments, a method performed by a drone for operating in a selected mode is provided. The selected mode may include at least one of a tracking mode and an observation mode, the drone may include a camera, the method may comprise calculating a communication ratio, calculating an object resolution ratio for the selected mode, and changing at least one of an altitude of the drone, a distance between the drone and an object, and a zoom factor of the camera until the communication ratio and the object resolution ratio for the selected mode are greater than or equal to one. While in the tracking mode, an object resolution of the object in an image of the camera may be greater than or equal to a surveillance resolution. While in the observation mode, an object resolution of the object in an image of the camera may be greater than or equal to an observation resolution. The communication ratio may be equal to a present communication rate of the drone divided by a communication rate threshold. The communication rate threshold may be sufficient to transmit live-stream video. The present communication rate may comprise a rate of communication between the drone at least one base station. The object resolution ratio for the tracking mode may be equal to an object resolution of the object in an image of the camera divided by a surveillance resolution. The object resolution ratio for the observation mode may be equal to an object resolution of the object in an image of the camera divided by an observation resolution.

In embodiments, a method performed by a drone for operating in a stealth mode is provided, where the drone includes a camera and the method comprises calculating a communication ratio, calculating an object resolution ratio, calculating a threshold distance between the drone and an object, the threshold distance establishes a sound intensity level as perceived by the object to be less than a sound intensity level threshold, the sound generated by operation of the drone, and changing at least one of an altitude of the drone, a distance between the drone and the object, and a zoom factor of the camera until the communication ratio and the object resolution ratio are greater than or equal to one while the distance between the drone and the object is never less than the threshold distance. The sound intensity level threshold may be less than or equal to 30 dB. The communication ratio may be equal to a present communication rate of the drone divided by a communication rate threshold. The communication rate threshold may be sufficient to transmit live-stream video. The present communication rate may comprise a rate of communication between the drone at least one base station. The object resolution ratio may be equal to an object resolution of the object in an image of the camera divided by a surveillance resolution.

In embodiments, a method performed by a drone to operate in a stealth mode is provided, the drone includes a camera, the method may comprise flying between a minimum altitude and a maximum altitude to establish a rate of communication between the drone and at least one base station that is greater than a communication rate threshold, maintaining at least a threshold distance between the drone and an object to establish a sound intensity level as perceived by the object to be less than a sound intensity level threshold, the sound generated by operation of the drone, and changing at least one of an altitude of the drone, a distance between the drone and the object, and a zoom factor of the camera to establish an object resolution that is greater than or equal to a surveillance resolution, while maintaining the altitude greater than the minimum altitude and less than the maximum altitude and the threshold distance between the drone and the object. The communication rate threshold may be sufficient to transmit live-stream video. The sound intensity level threshold may be less than or equal to 30 dB. The surveillance resolution may comprise a minimum number of pixels of an image captured by the camera. The method may comprise the drone flying between 55° and 90° from horizontal over the object.

In embodiments, a non-transitory computer-readable medium having stored thereon computer-readable instructions for regulating a drone is provided. When executed by a processing circuit of the drone, the instructions cause the drone to perform operations may comprise comparing a sound intensity level threshold to a sound intensity level of the drone, comparing an object resolution threshold to an object resolution of an object in an image captured by a camera of the drone, and automatically changing a distance between the drone and the object in accordance with the comparison of the sound intensity level threshold to the sound intensity level of the drone and the comparison of the object resolution threshold to the object resolution of the object in the image captured by the camera of the drone. The operations may further comprise receiving a sound intensity level of an environment proximate to the object and setting the sound intensity level threshold less than or equal to the sound intensity level of the environment proximate to the object. Receiving the sound intensity level of the environment proximate to the object may include receiving the sound intensity level of the environment proximate to the object via a wireless communication link established between the drone and a remote microphone located in the environment proximate to the object. Automatically changing the distance between the drone and the object may include automatically changing the distance between the drone and the object until the object resolution of the object in the image captured by the camera of the drone is equal or greater than the object resolution threshold and the sound intensity level of the drone is less than the sound intensity level threshold. Automatically changing the distance between the drone and the object may include automatically increasing the distance between the drone and the object until the sound intensity level threshold is greater than the sound intensity level of the drone. The distance may also be increase while and/or until the object resolution of the object in the image captured by the camera of the drone is equal or greater than the object resolution threshold. Automatically changing the distance between the drone and the object may include automatically decreasing the distance between the drone and the object until the object resolution of the object in the image captured by the camera of the drone is equal or greater than the object resolution threshold. The distance may also decrease while or until the sound intensity level of the drone is less than the sound intensity level threshold. Comparing the sound intensity level threshold to the sound intensity level of the drone may include calculating a sound intensity level ratio and automatically changing the distance between the drone and the object may include changing the distance until the sound intensity level ratio is equal or greater than a predetermined value. Calculating the sound intensity level ratio may comprise dividing the sound intensity level threshold by the sound intensity level of the drone. Comparing the object resolution threshold to the object resolution of the object may include calculating an object resolution ratio and automatically changing the distance between the drone and the object may include changing the distance until the object resolution ratio is equal or greater than a predetermined value. The object resolution threshold may be selected in accordance with a mode of operation of the drone and calculating the object resolution ratio may comprise dividing the object resolution of the object in the image captured by the camera of the drone by the object resolution threshold. The operations may further comprise comparing a communication rate to a communication rate threshold and automatically changing the distance between the drone and the object in accordance with the comparison of the sound intensity level threshold to the sound intensity level of the drone, the comparison of the object resolution threshold to the object resolution of the object in the image captured by the camera of the drone, and the comparison of the communication rate to the communication rate threshold. Comparing the communication rate may include calculating a communication ratio by dividing the communication rate of the drone by the communication rate threshold and automatically changing the distance between the drone and the object may include changing the distance until the communication ratio is equal or greater than a predetermined value. The communication rate threshold may be a live-stream video communication rate threshold for transmitting live-stream video data to a remote server from the drone. The operations may comprise changing a zoom factor of the camera in accordance with the comparison of the sound intensity level threshold to the sound intensity level of the drone and the comparison of the object resolution threshold to the object resolution of the object. Comparing the sound intensity level threshold to the sound intensity level of the drone may include estimating the sound intensity level of the drone at the object.

In embodiment, an apparatus configured to automatically position itself in air relative to an object is provided. The apparatus may comprise a camera configured to capture an image of the object, flight mechanisms configured to move the apparatus in air, the flight mechanisms including at least one motor and at least one propeller, a processing circuit, and at least one tangible non-transitory computer-readable storage medium storing instructions that, when executed by the processing circuit, cause the processing circuit to perform operations comprising comparing a sound intensity level threshold to a sound intensity level of the apparatus, comparing an object resolution threshold to an object resolution of the object in the image captured by the camera, and automatically controlling the flight mechanisms to change a distance between the apparatus and the object in accordance with the comparison of the sound intensity level threshold to the sound intensity level of the apparatus and the comparison of the object resolution threshold to the object resolution of the object in the image captured by the camera. The operations may comprise receiving a sound intensity level of a background noise near the object and setting the sound intensity level threshold less than or equal to the sound intensity level of the background noise near the object. The operations may comprise changing at least one of a zoom factor of the camera and an altitude of the apparatus in accordance with the comparison of the sound intensity level threshold to the sound intensity level of the apparatus and the comparison of the object resolution threshold to the object resolution of the object in the image captured by the camera. The apparatus may further comprise a communication circuit configured to establish a wireless communication link between the apparatus and a remote microphone, wherein receiving the sound intensity level of the background noise near the object may include receiving the sound intensity level of the background noise near the object via the wireless communication link established between the communication circuit and the remote microphone.

In embodiments, a method performed by a drone operating in a stealth mode is provided, the method comprising comparing a sound intensity level threshold to a sound intensity level of the drone, comparing an object resolution threshold to an object resolution of an object in an image captured by a camera of the drone, and automatically changing a distance between the drone and the object in accordance with the comparison of the sound intensity level threshold to the sound intensity level of the drone and the comparison of the object resolution threshold to the object resolution of the object in the image captured by the camera. The method may comprise receiving a measured sound intensity level of the drone from a sensor and determining at least one of the sound intensity threshold and the sound intensity level of the drone in accordance with the measured sound intensity level of the drone from the sensor. The sensor may be a remote sensor and receiving the measured sound intensity level of the drone from the sensor may include receiving the measured sound intensity level of the drone from the sensor via a wireless communication link between the drone and the remote sensor.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A non-transitory computer-readable medium having stored thereon computer-readable instructions for regulating a drone that, when executed by a processing circuit of the drone, cause the drone to perform operations comprising:
   comparing a sound intensity level threshold to a sound intensity level of the drone;
   comparing an object resolution threshold to an object resolution of an object in an image captured by a camera of the drone; and
   automatically changing a distance between the drone and the object in accordance with the comparison of the sound intensity level threshold to the sound intensity level of the drone and the comparison of the object resolution threshold to the object resolution of the object in the image captured by the camera of the drone.

2. The non-transitory computer-readable medium of claim 1, wherein the operations further comprise:
   receiving a sound intensity level of an environment proximate to the object; and
   setting the sound intensity level threshold less than or equal to the sound intensity level of the environment proximate to the object.

3. The non-transitory computer-readable medium of claim 2, wherein receiving the sound intensity level of the environment proximate to the object includes receiving the sound intensity level of the environment proximate to the object via a wireless communication link established between the drone and a remote microphone located in the environment proximate to the object.

4. The non-transitory computer-readable medium of claim 1, wherein automatically changing the distance between the drone and the object includes automatically changing the distance between the drone and the object until the object resolution of the object in the image captured by the camera of the drone is equal or greater than the object resolution threshold and the sound intensity level of the drone is less than the sound intensity level threshold.

5. The non-transitory computer-readable medium of claim 1, wherein automatically changing the distance between the drone and the object includes automatically increasing the distance between the drone and the object until the sound intensity level threshold is greater than the sound intensity level of the drone.

6. The non-transitory computer-readable medium of claim 1, wherein automatically changing the distance between the drone and the object includes automatically decreasing the distance between the drone and the object until the object resolution of the object in the image captured by the camera of the drone is equal or greater than the object resolution threshold.

7. The non-transitory computer-readable medium of claim 1, wherein comparing the sound intensity level threshold to the sound intensity level of the drone includes calculating a sound intensity level ratio; and
   automatically changing the distance between the drone and the object includes changing the distance until the sound intensity level ratio is equal or greater than a predetermined value.

8. The non-transitory computer-readable medium of claim 7, wherein calculating the sound intensity level ratio comprises dividing the sound intensity level threshold by the sound intensity level of the drone.

9. The non-transitory computer-readable medium of claim 1, wherein comparing the object resolution threshold to the object resolution of the object includes calculating an object resolution ratio; and
  automatically changing the distance between the drone and the object includes changing the distance until the object resolution ratio is equal or greater than a predetermined value.

10. The non-transitory computer-readable medium of claim 9, wherein the object resolution threshold is selected in accordance with a mode of operation of the drone; and
  calculating the object resolution ratio comprises dividing the object resolution of the object in the image captured by the camera of the drone by the object resolution threshold.

11. The non-transitory computer-readable medium of claim 1, wherein the operations comprise:
  comparing a communication rate to a communication rate threshold; and
  automatically changing the distance between the drone and the object in accordance with the comparison of the sound intensity level threshold to the sound intensity level of the drone, the comparison of the object resolution threshold to the object resolution of the object in the image captured by the camera of the drone, and the comparison of the communication rate to the communication rate threshold.

12. The non-transitory computer-readable medium of claim 11, wherein:
  comparing the communication rate includes calculating a communication ratio by dividing the communication rate of the drone by the communication rate threshold; and
  automatically changing the distance between the drone and the object includes changing the distance until the communication ratio is equal or greater than a predetermined value.

13. The non-transitory computer-readable medium of claim 1, wherein the operations comprise changing a zoom factor of the camera in accordance with the comparison of the sound intensity level threshold to the sound intensity level of the drone and the comparison of the object resolution threshold to the object resolution of the object.

14. The non-transitory computer-readable medium of claim 1, wherein comparing the sound intensity level threshold to the sound intensity level of the drone includes estimating the sound intensity level of the drone at the object.

15. An apparatus configured to automatically position itself relative to an object, the apparatus comprising:
  a camera configured to capture an image of the object;
  flight mechanisms configured to move the apparatus in air, the flight mechanisms including at least one motor and at least one propeller;
  a processing circuit; and
  at least one tangible non-transitory computer-readable storage medium storing instructions that, when executed by the processing circuit, cause the processing circuit to perform operations comprising:
    comparing a sound intensity level threshold to a sound intensity level of the apparatus;
    comparing an object resolution threshold to an object resolution of the object in the image captured by the camera; and
    automatically controlling the flight mechanisms to change a distance between the apparatus and the object in accordance with the comparison of the sound intensity level threshold to the sound intensity level of the apparatus and the comparison of the object resolution threshold to the object resolution of the object in the image captured by the camera.

16. The apparatus of claim 15, wherein the operations comprise:
  receiving a sound intensity level of a background noise near the object; and
  setting the sound intensity level threshold less than or equal to the sound intensity level of the background noise near the object.

17. The apparatus of claim 16, further comprising a communication circuit configured to establish a wireless communication link between the apparatus and a remote microphone, wherein receiving the sound intensity level of the background noise near the object includes receiving the sound intensity level of the background noise near the object via the wireless communication link established between the communication circuit and the remote microphone.

18. A method performed by a drone operating in a stealth mode, the method comprising:
  comparing a sound intensity level threshold to a sound intensity level of the drone;
  comparing an object resolution threshold to an object resolution of an object in an image captured by a camera of the drone; and
  automatically changing a distance between the drone and the object in accordance with the comparison of the sound intensity level threshold to the sound intensity level of the drone and the comparison of the object resolution threshold to the object resolution of the object in the image captured by the camera.

19. The method of claim 18, comprising:
  receiving a measured sound intensity level of the drone from a sensor; and
  determining at least one of the sound intensity level threshold and the sound intensity level of the drone in accordance with the measured sound intensity level of the drone from the sensor.

20. The method of claim 19, wherein the sensor is a remote sensor and receiving the measured sound intensity level of the drone from the sensor includes receiving the measured sound intensity level of the drone from the sensor via a wireless communication link between the drone and the remote sensor.

* * * * *